US006596557B1

(12) United States Patent
Nir

(10) Patent No.: US 6,596,557 B1
(45) Date of Patent: Jul. 22, 2003

(54) INTEGRATED OPTICAL DEVICES AND METHODS OF MAKING SUCH DEVICES

(75) Inventor: David Nir, Tel Aviv (IL)

(73) Assignee: Orchid Lightwave Communications, Inc., Palo Alto, CA (US)

( * ) Notice: Subject to any disclaimer, the term of this patent is extended or adjusted under 35 U.S.C. 154(b) by 0 days.

(21) Appl. No.: 09/572,570

(22) Filed: May 16, 2000

Related U.S. Application Data

(60) Provisional application No. 60/186,359, filed on May 16, 2000.

(51) Int. Cl.[7] .............................. H01L 21/00; G02B 6/42
(52) U.S. Cl. ............................. 438/29; 438/27; 438/31; 438/33; 438/69; 438/72; 385/41; 385/42
(58) Field of Search ............................. 438/29, 31, 69, 438/72, 27, 33; 385/41, 42; 65/385, 386, 406, 407, 408, 433

(56) References Cited

U.S. PATENT DOCUMENTS

| | | | | |
|---|---|---|---|---|
| 3,996,492 A | * | 12/1976 | McGroddy | 372/93 |
| 4,114,257 A | * | 9/1978 | Bellavance | 438/24 |
| 4,503,541 A | * | 3/1985 | Weller et al. | 372/50 |
| 4,622,671 A | * | 11/1986 | Tsang | 372/19 |
| 4,759,595 A | * | 7/1988 | Boord et al. | 385/21 |
| 5,032,219 A | * | 7/1991 | Buchmann et al. | 438/39 |
| 5,185,290 A | * | 2/1993 | Aoyagi et al. | 438/29 |
| 5,228,047 A | * | 7/1993 | Matsumoto et al. | 372/45 |
| 5,345,521 A | * | 9/1994 | McDonald et al. | 385/19 |
| 5,788,856 A | * | 8/1998 | Kuhn | 216/24 |
| 6,060,334 A | * | 5/2000 | Tsuruma | 438/31 |

OTHER PUBLICATIONS

Nir et al., "Very Short Integrated–Optic–Fabry–Perot Cavity–Coupler Switch for DC and High Bandwidth Operation", IEEE Journel of Quantum Electronics, Nov. 1992, pp. 2544–2550.*

Kawai et al., "Cavity–Type Directional Couplers with Simple Structure", IEEE Microwave Symposium Digest, Jun. 1997, pp. 413–416.*

Marxer et al., "Vertical Mirrors Fabricated by Deep Reactive Ion Etching for Fiber–Optic Switching Applications", Journel of Microelectromechanical Systems, Sep. 1997, pp. 277–285.*

Tishinin, et al., "Novel Fabrication Process for Vertical Resonant Coupler with Precise Coupling Efficiency Control", IEEE Lasers and Electro–Optics Society Annual Meeting, Dec. 1998, pp. 93–94.*

"Low Cost, Multiple Fixed Wavelength Laser Array", IBM Tech. Disclosure Bulletin, Mar. 1994, pp. 259–262.*

"Wavelength–Division Multiplexed Laser Transmitter Using Wavelength–Selective and Beam–Steering Gratings", IBM Tech. Disclosure Bulletin, Mar. 1996, pp. 115–118.*

* cited by examiner

Primary Examiner—Matthew Smith
Assistant Examiner—Lex H. Malsawma
(74) Attorney, Agent, or Firm—G.E. Ehrlich Ltd.

(57) ABSTRACT

An integrated-optical device including a substrate having waveguide and a plurality of electrodes to receive electrical signals for controlling the light transmission through the pathways. The waveguide pathways are in an interaction zone of an electro-optically active waveguide material whose refractive index changes in response to electrical signals applied to the electrodes, and also in an access zone providing optical access to the interaction zone. The active waveguide material in the interaction zone is preferably a different material from the waveguide material in the access zone, enabling improved performance and/or simpler fabrication in a number of described respects.

43 Claims, 28 Drawing Sheets

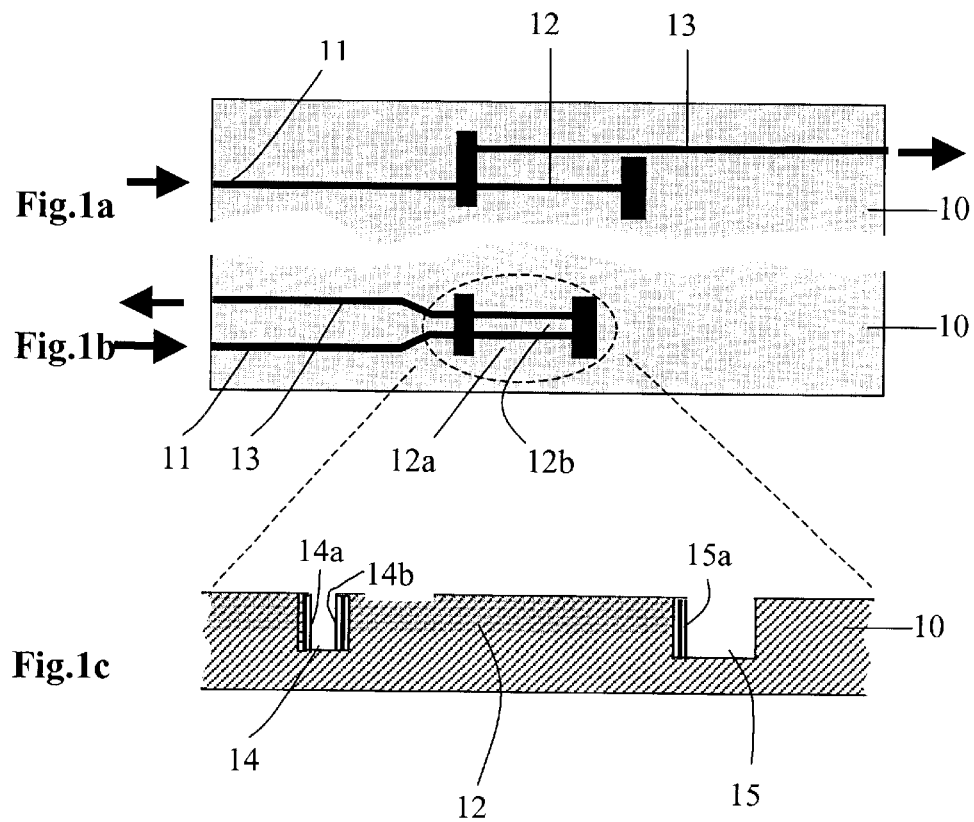
Fig.1a
Fig.1b
Fig.1c
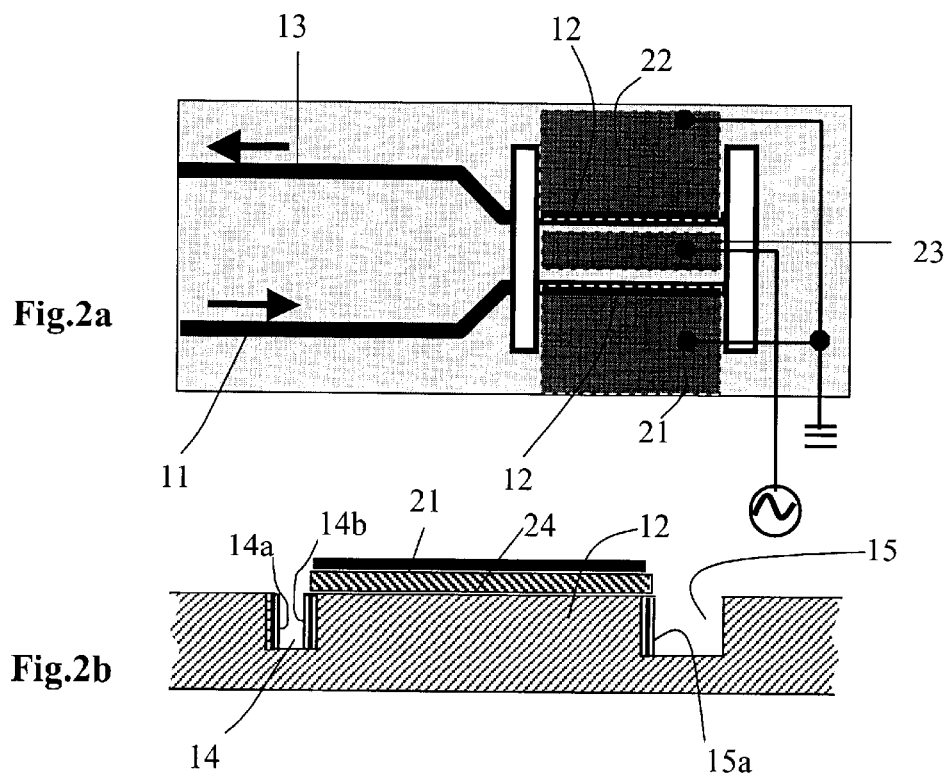
Fig.2a
Fig.2b
(PRIOR ART)

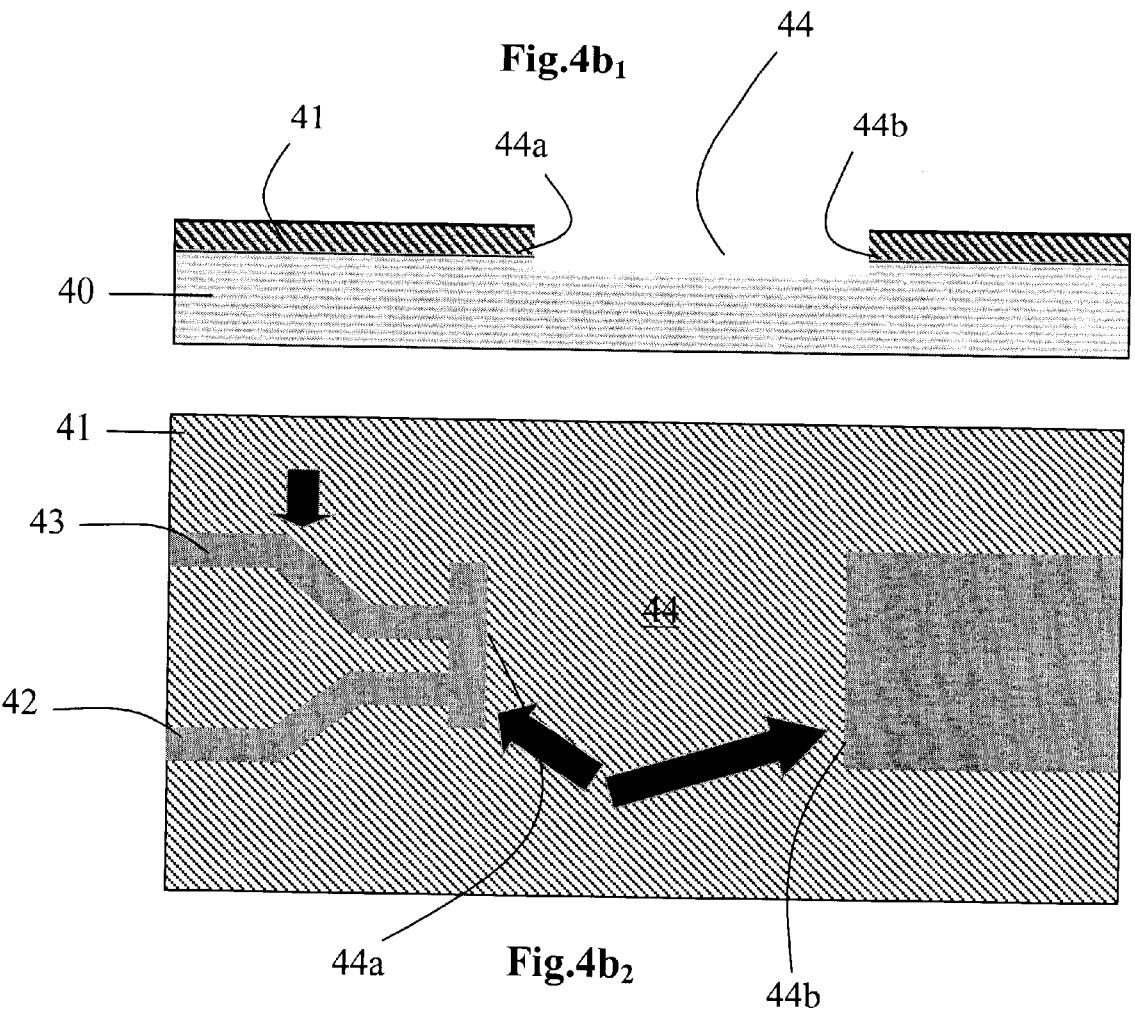

Fig.4c₁
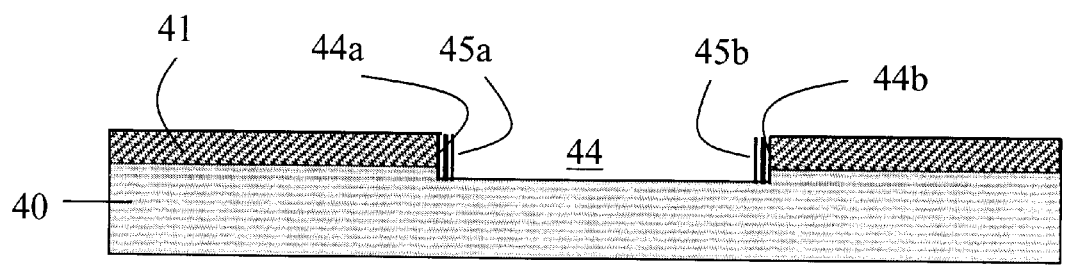
Fig.4c₂
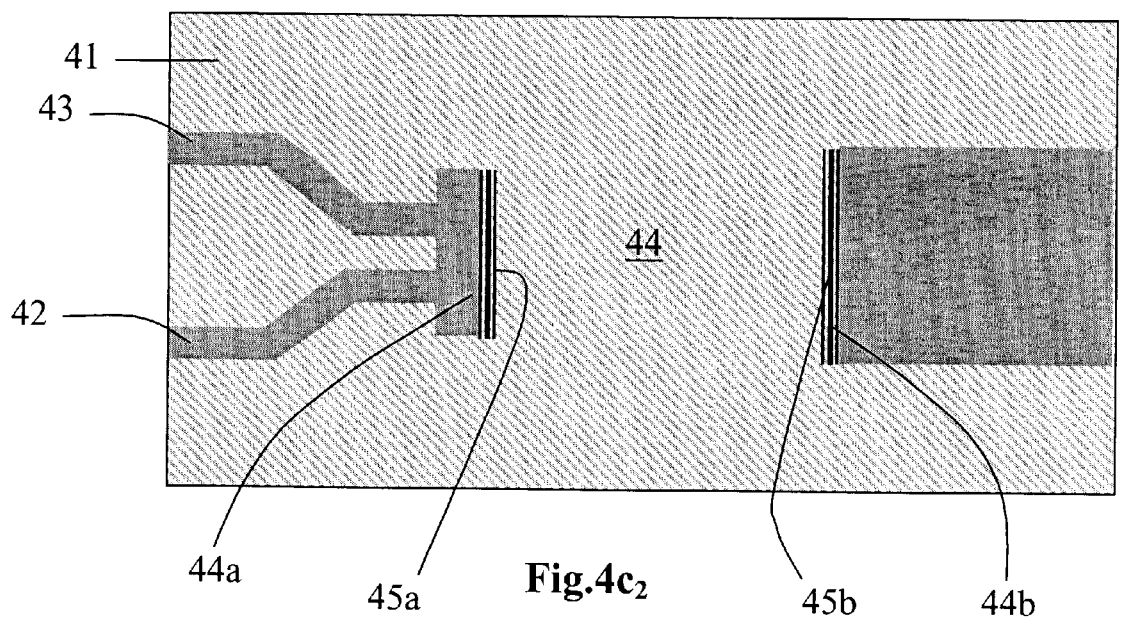

Fig.4d₁
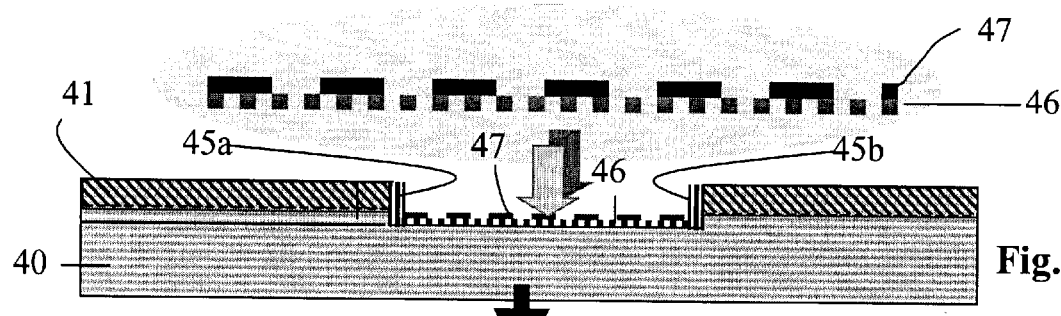
Fig.4d₂
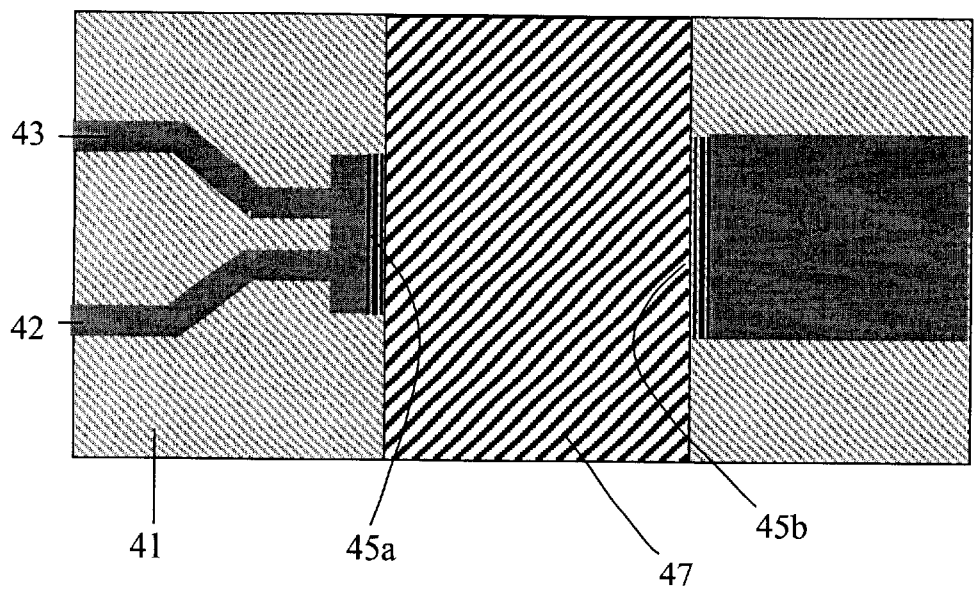
Fig.4d₃

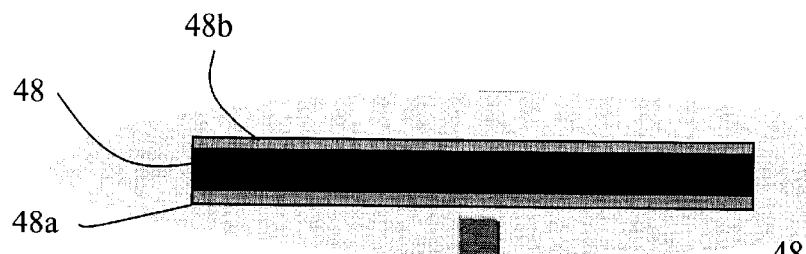
Fig.4e₁
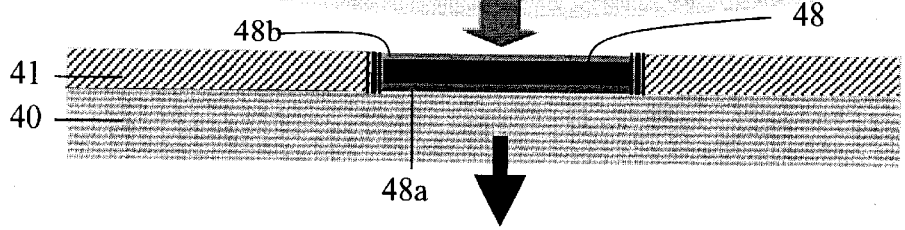
Fig.4e₂
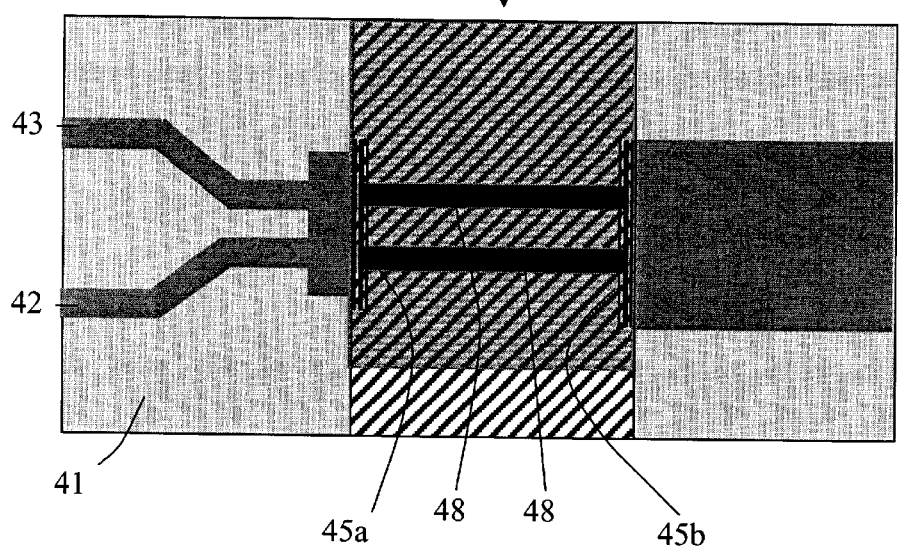
Fig.4e₃
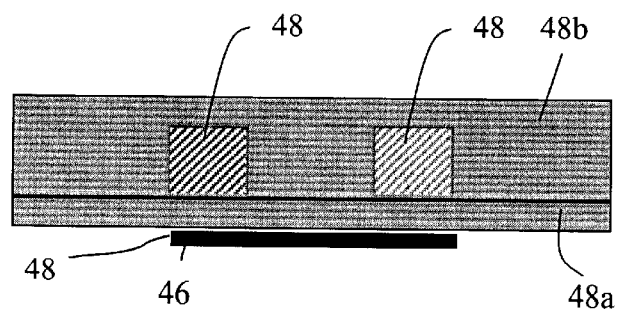
Fig.4f

Fig.4g₁
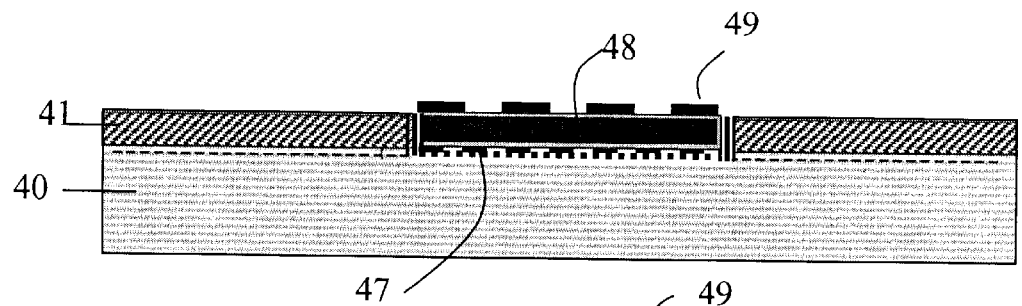
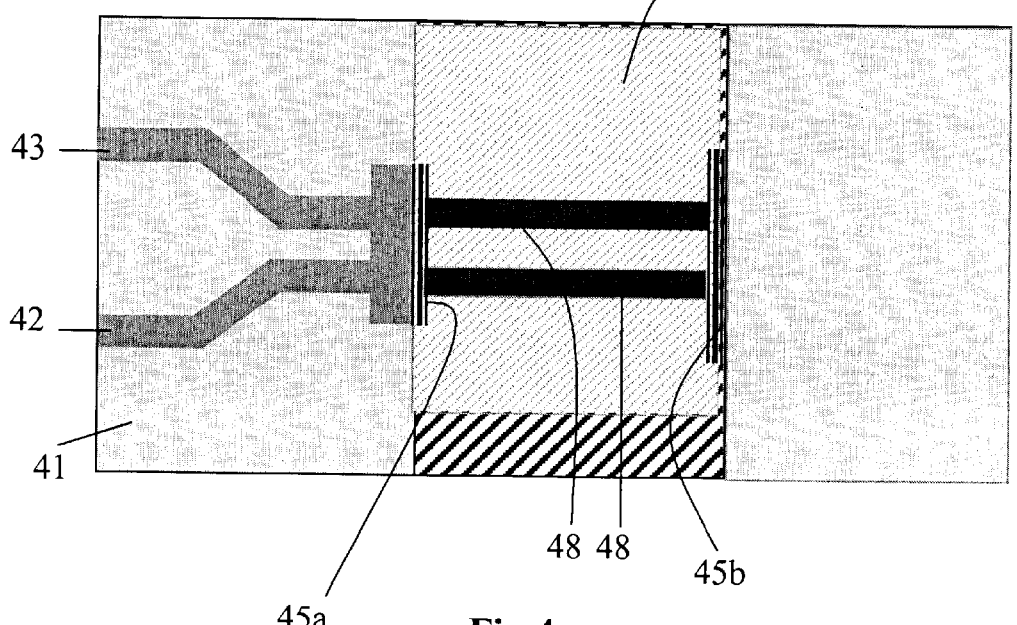
Fig.4g₂

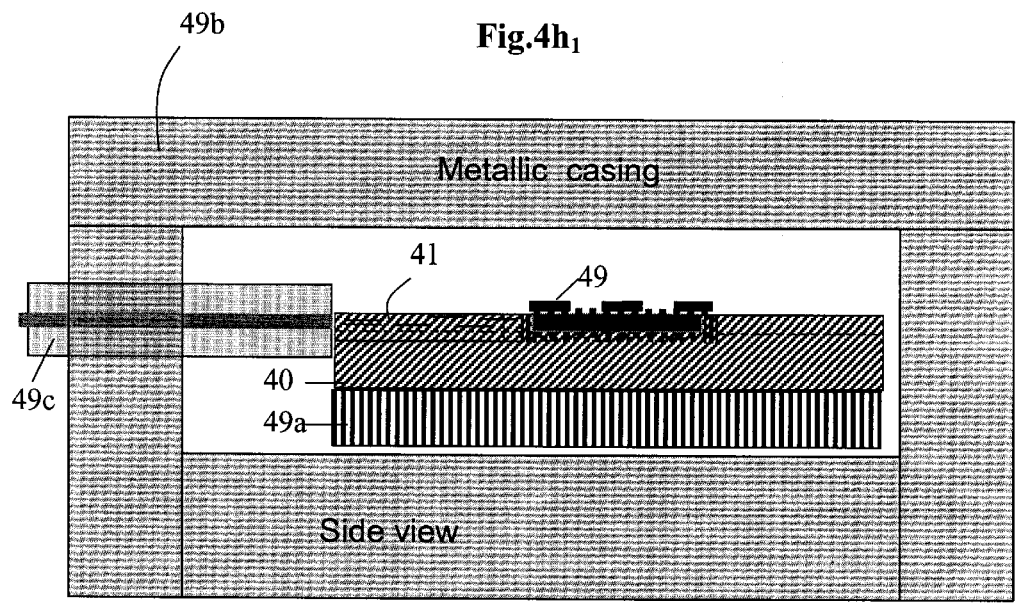
Fig.4h₁
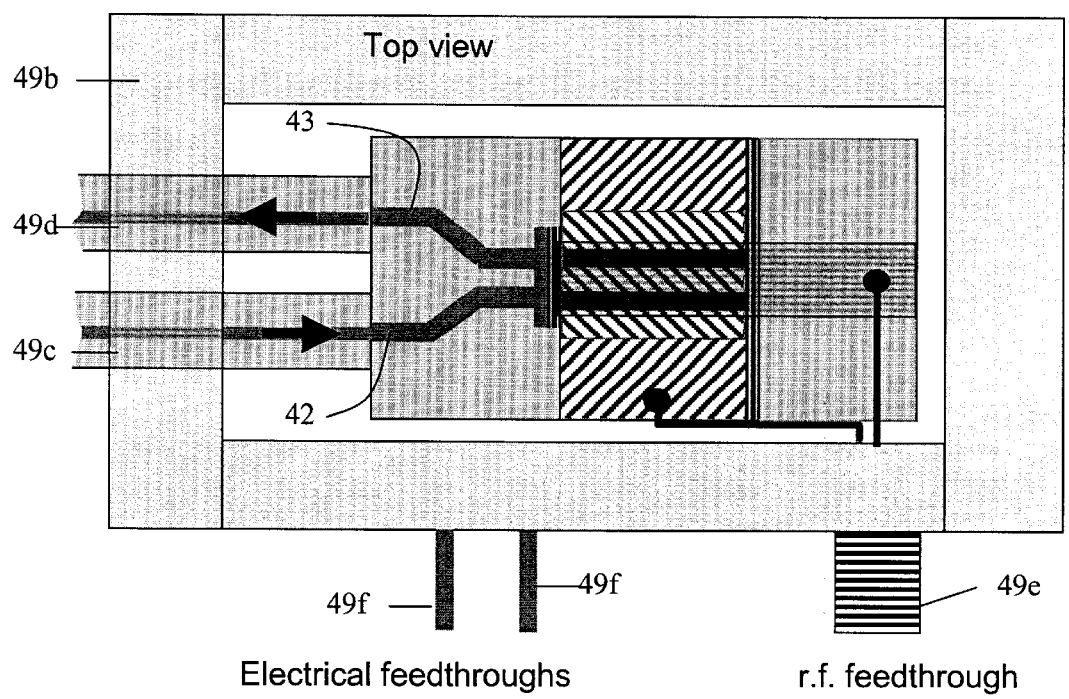
Fig.4h₂

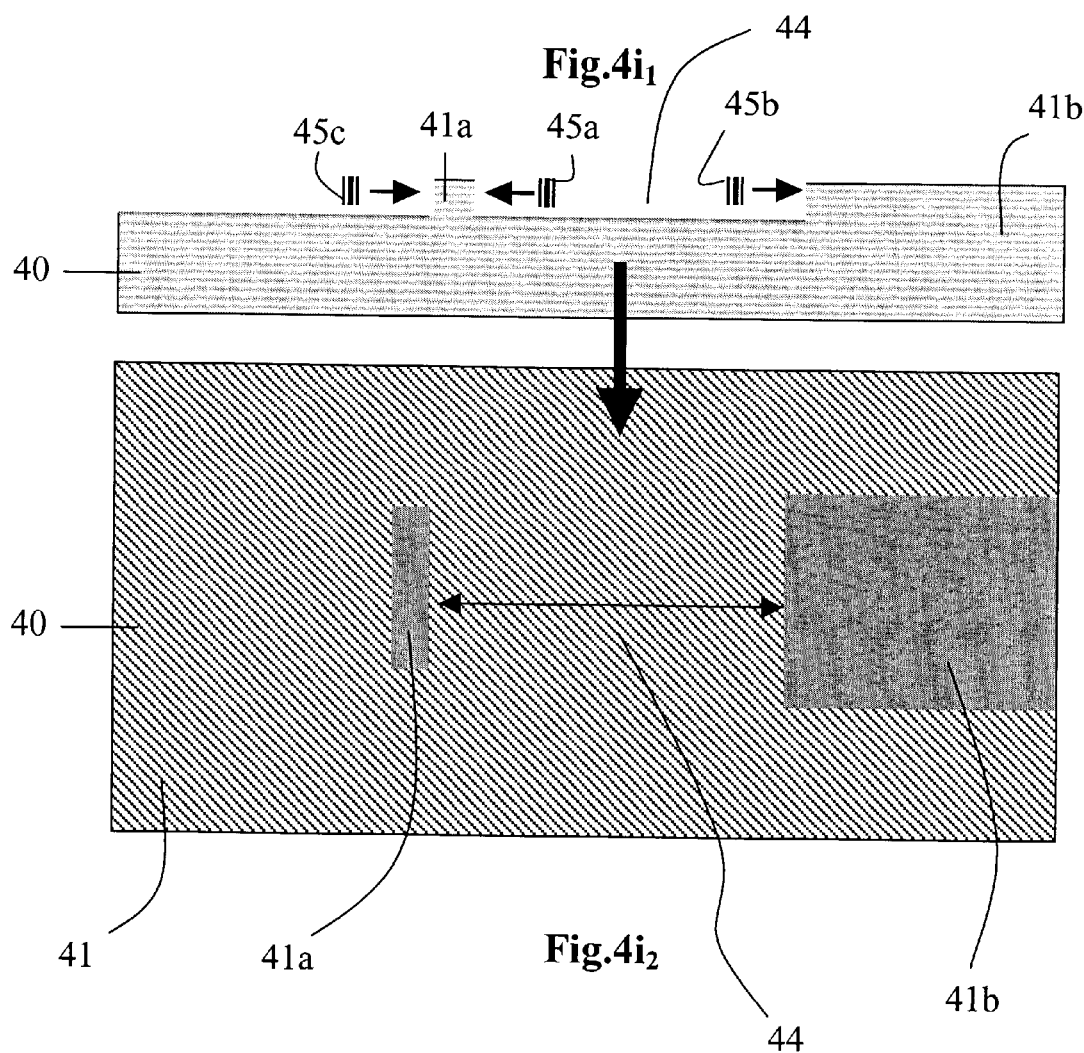

Fig.5a₁
Fig.5a₂
Fig.5b₁
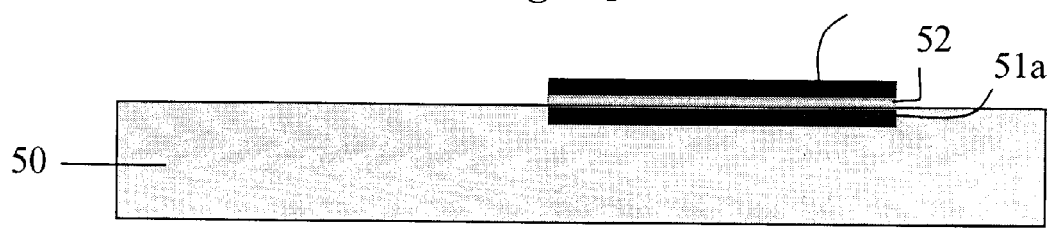
Fig.5b₂

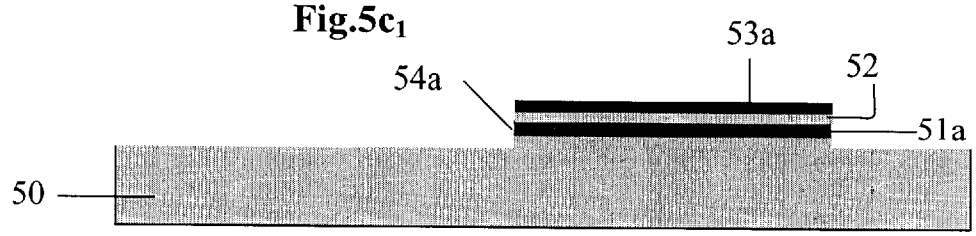
Fig.5c₁
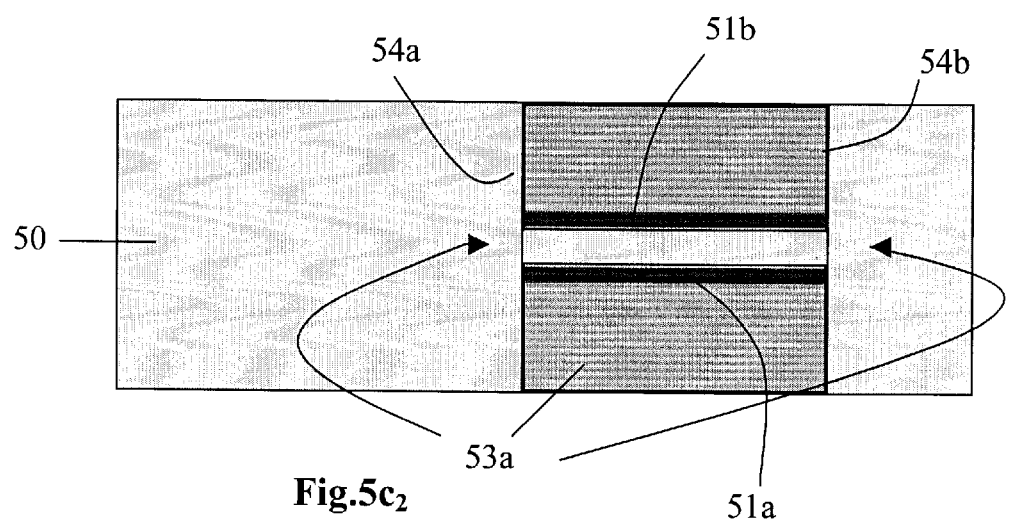
Fig.5c₂
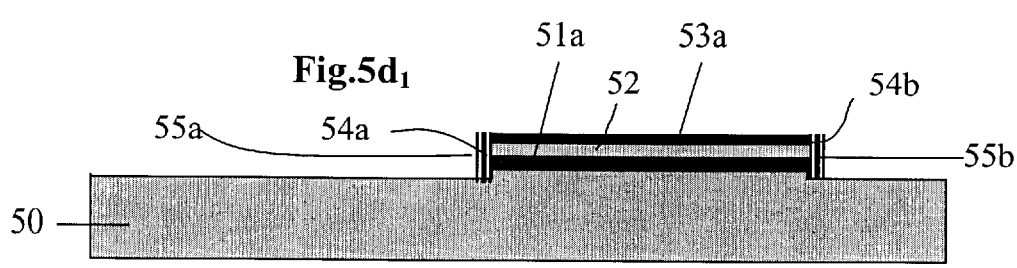
Fig.5d₁
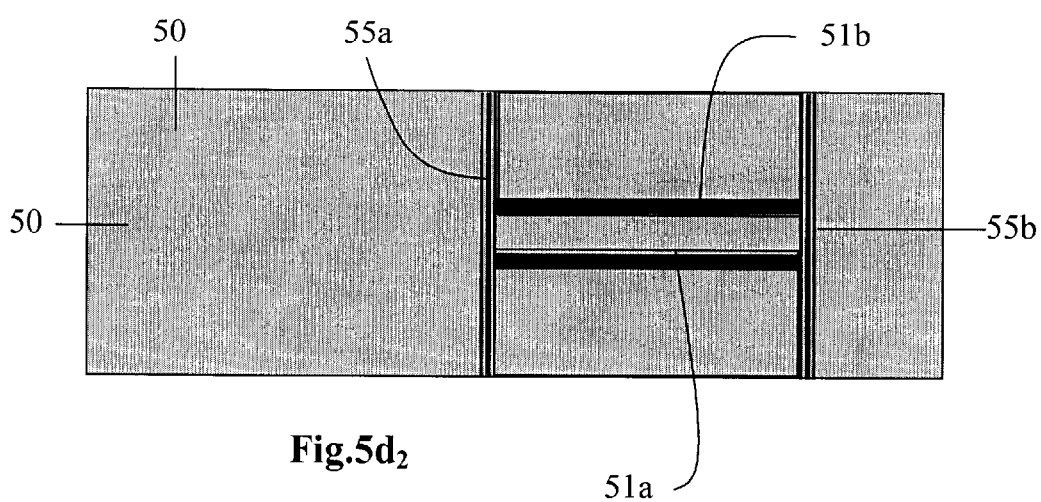
Fig.5d₂

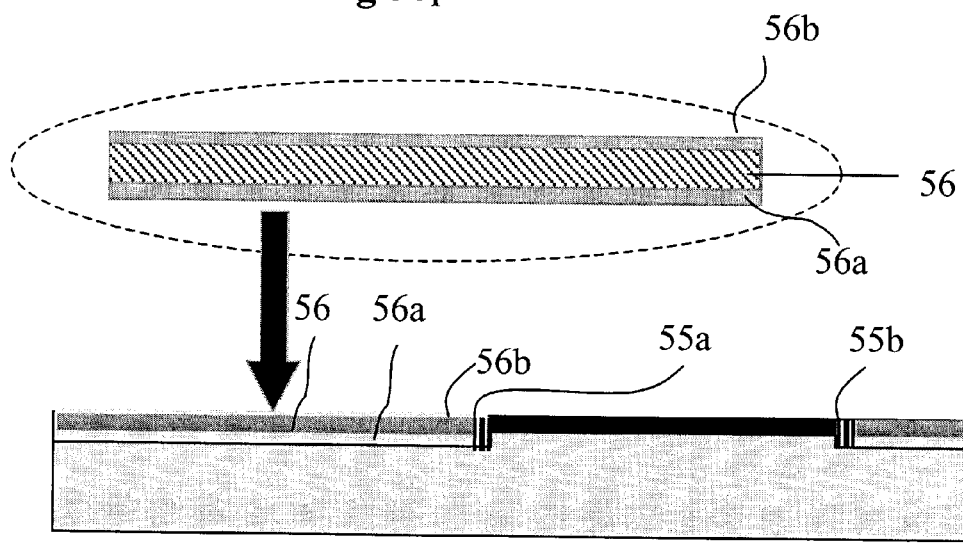
Fig.5e₁
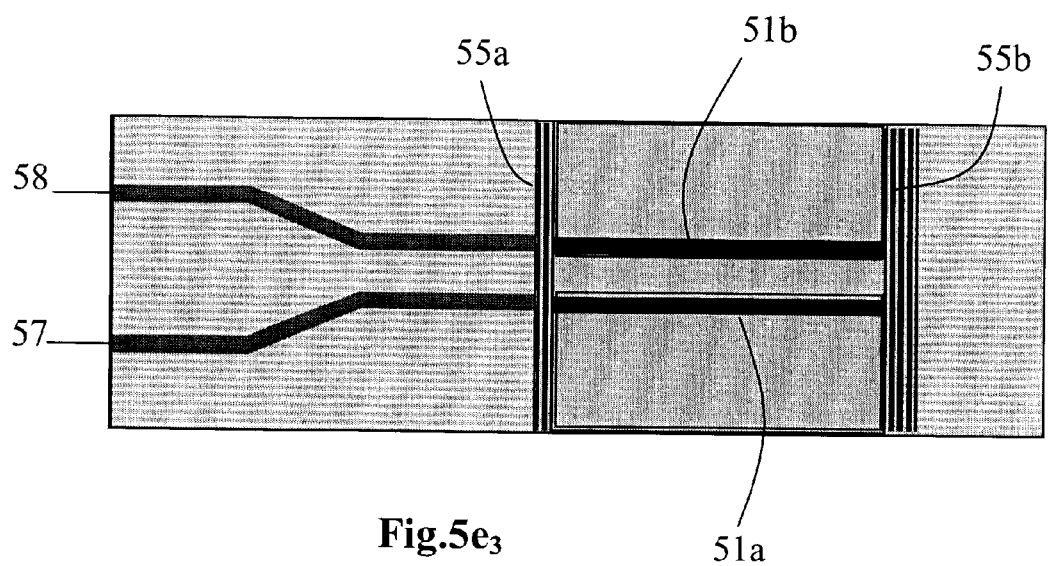
Fig.5e₂
Fig.5e₃

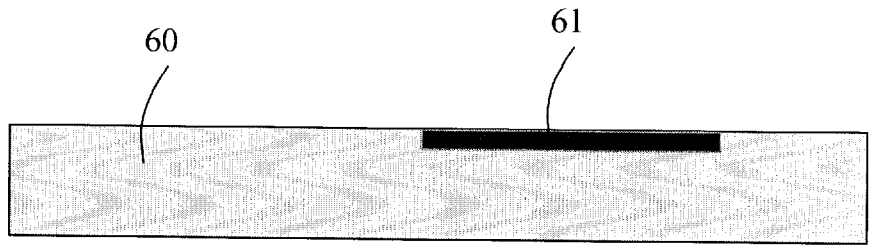
Fig.6a₁
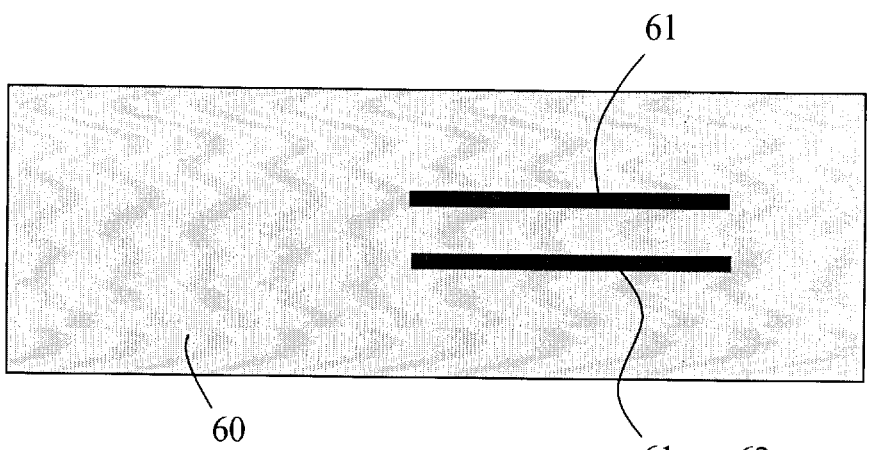
Fig.6a₂
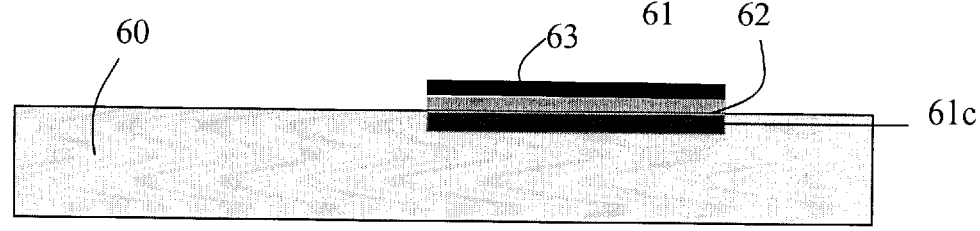
Fig.6b₁
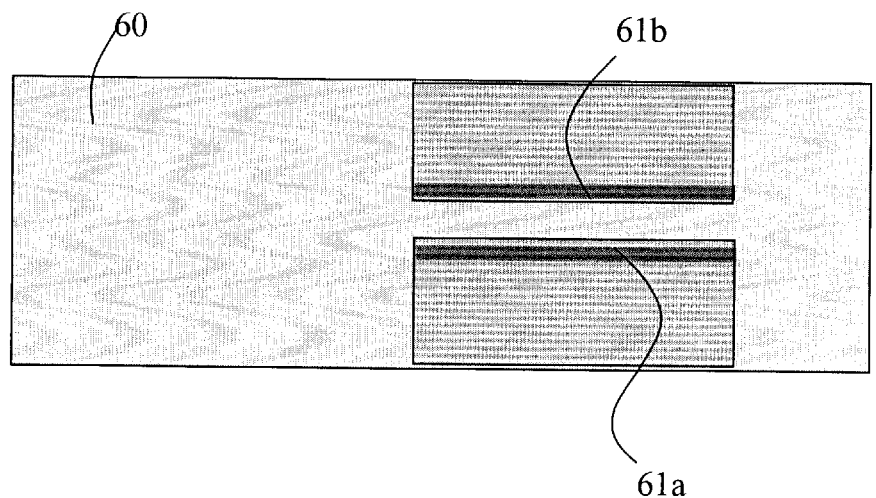
Fig.6b₂

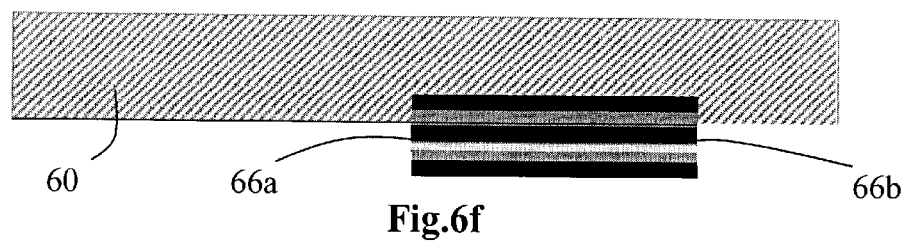
Fig.6f
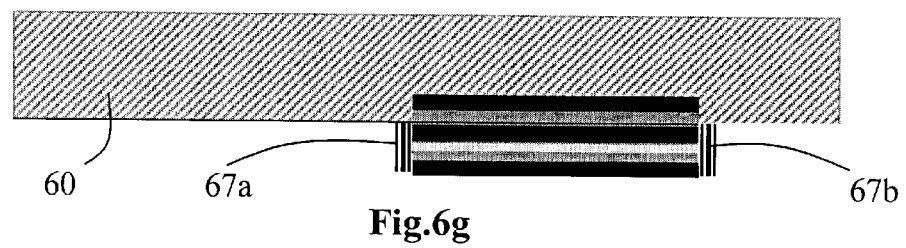
Fig.6g
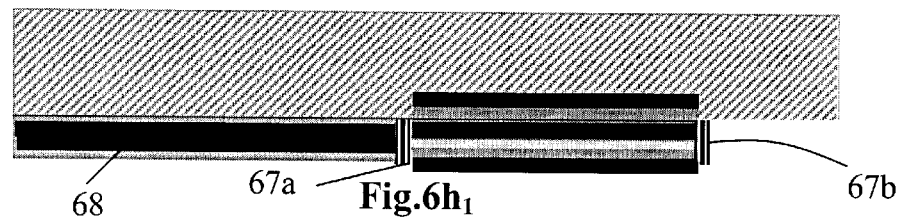
Fig.6h₁
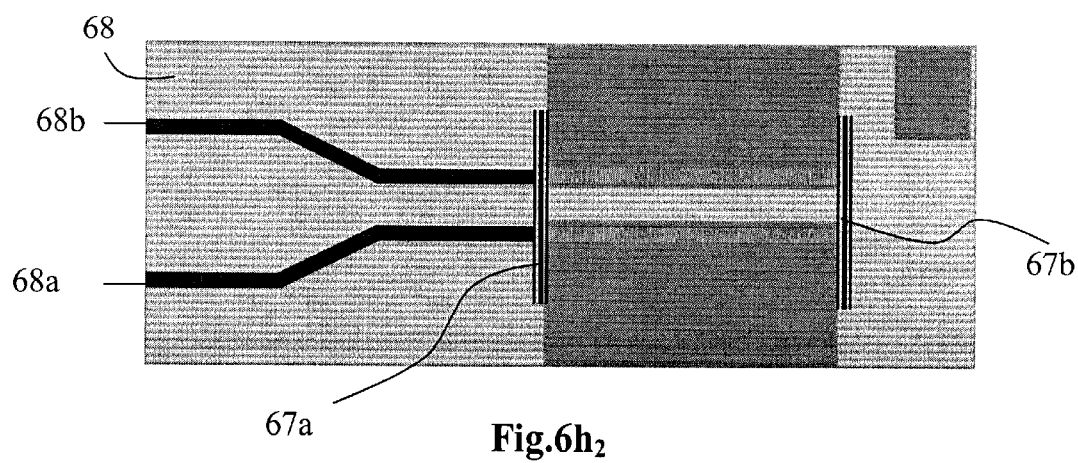
Fig.6h₂

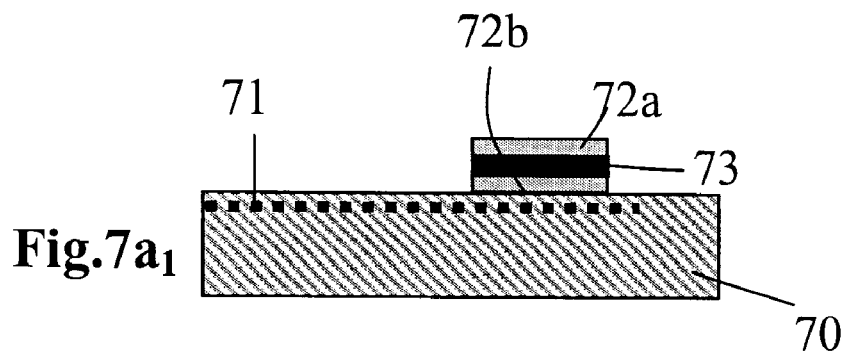
Fig.7a₁
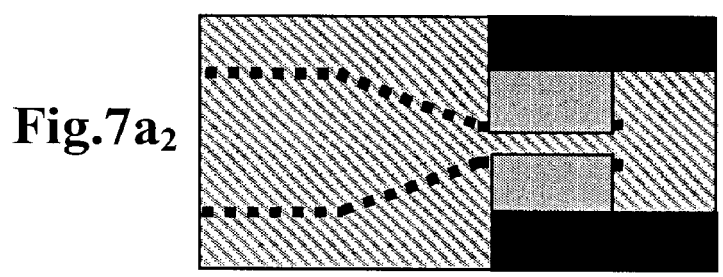
Fig.7a₂
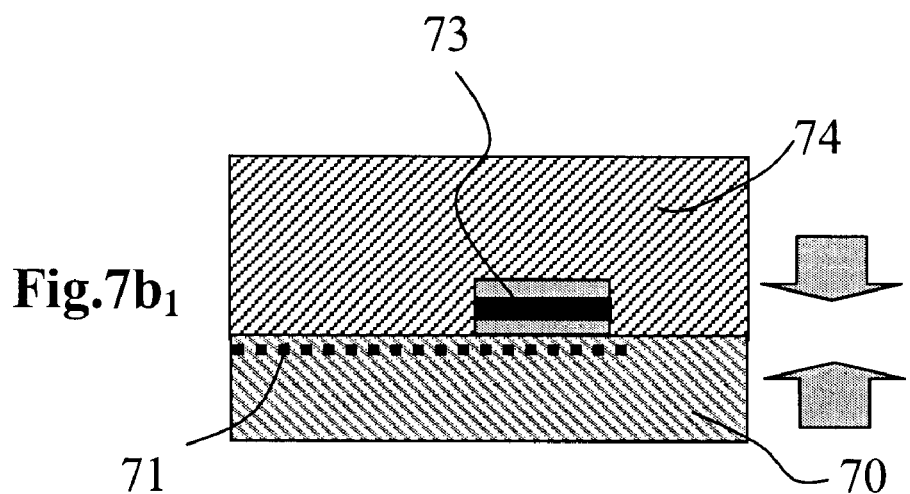
Fig.7b₁
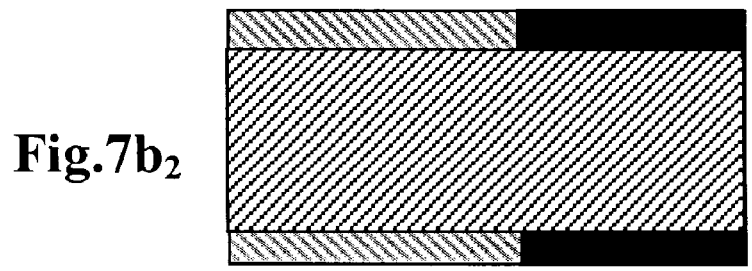
Fig.7b₂

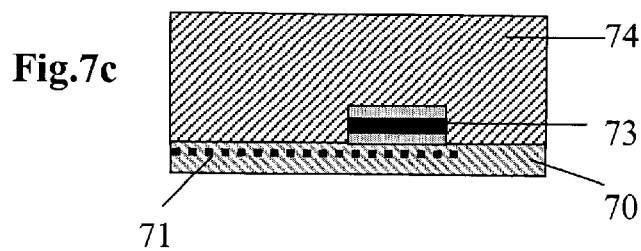
Fig.7c
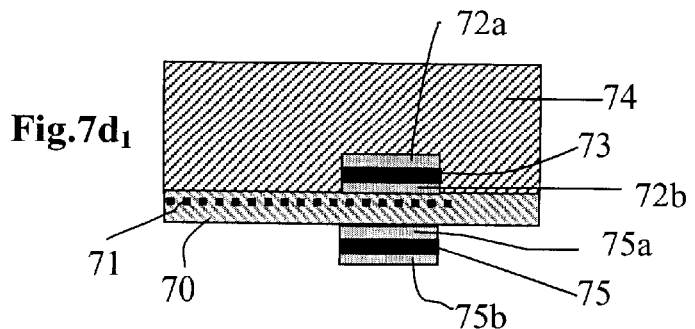
Fig.7d₁
Fig.7d₂
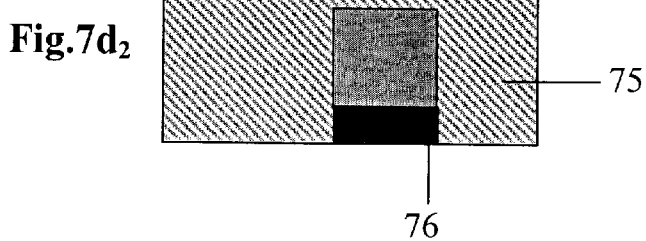
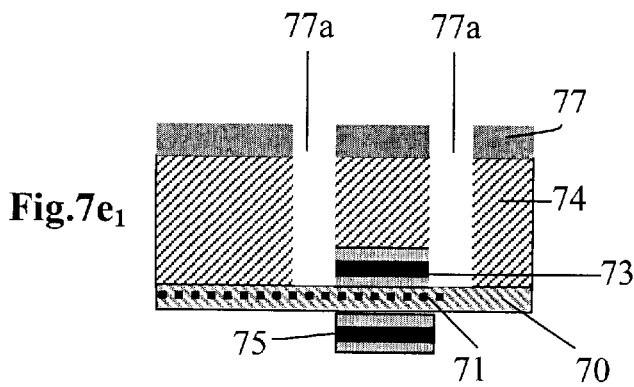
Fig.7e₁
Fig.7e₂
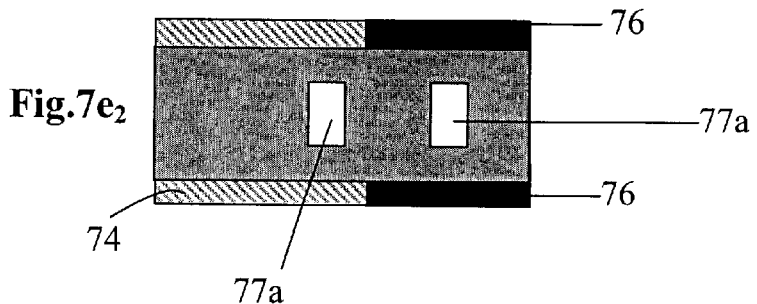

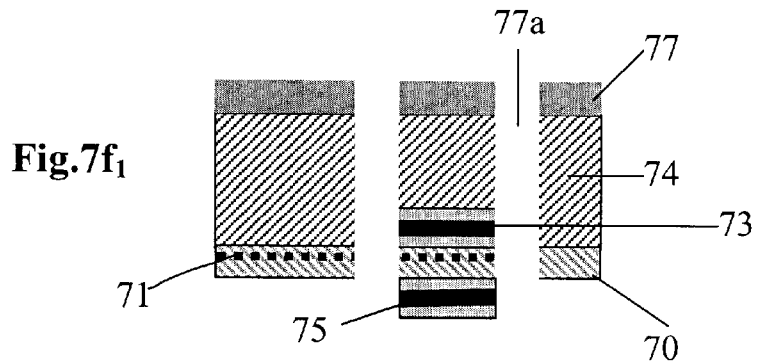
Fig.7f₁
Fig.7f₂
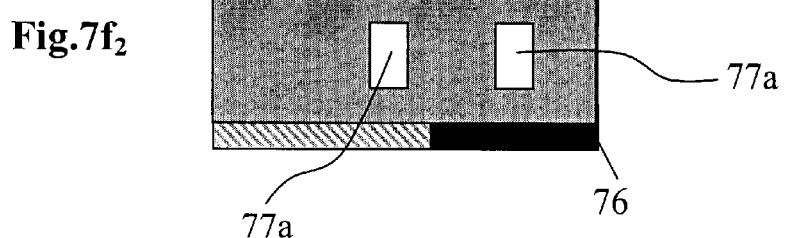
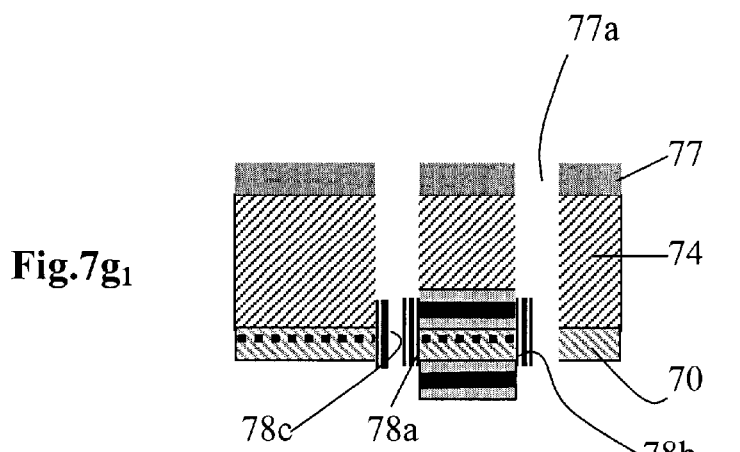
Fig.7g₁
Fig.7g₂
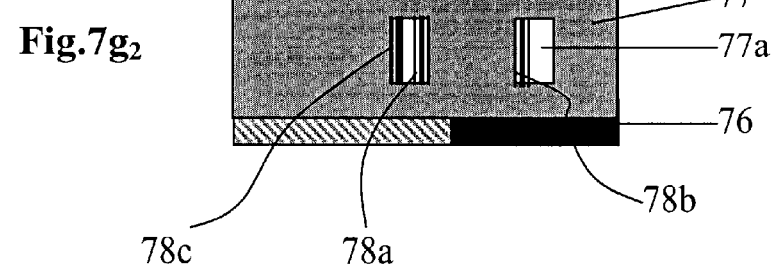

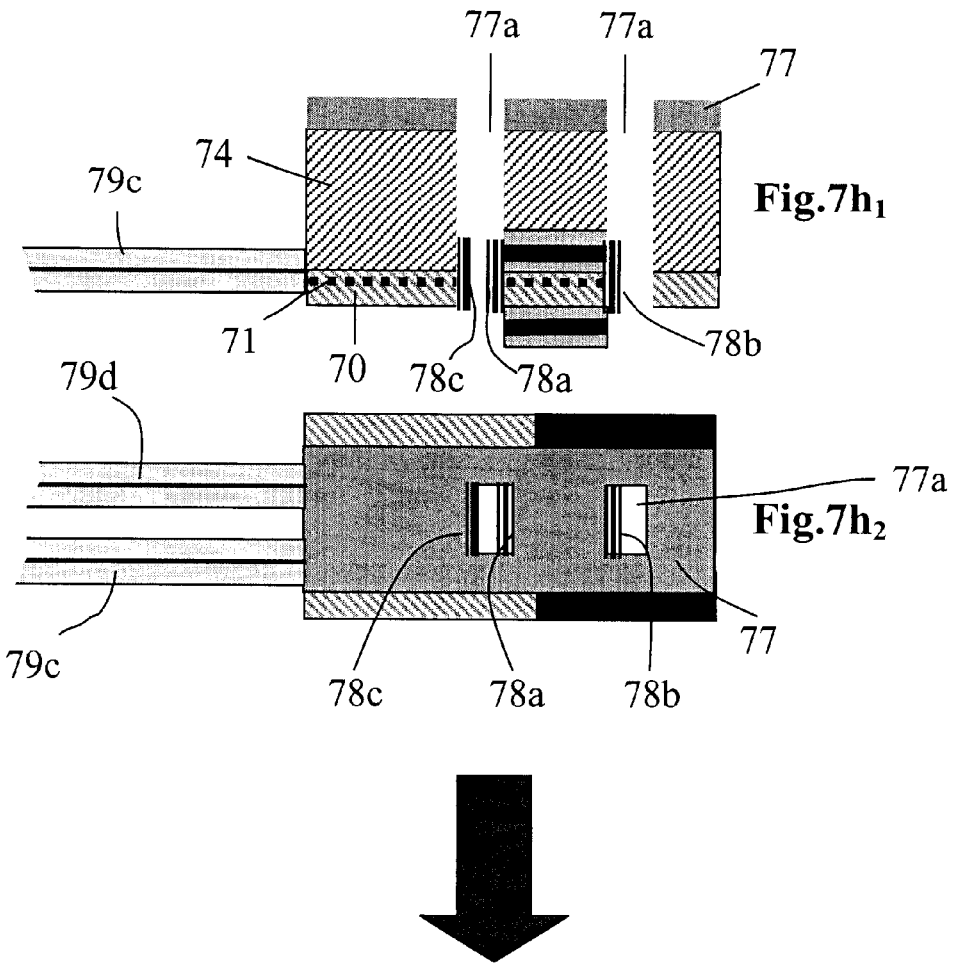
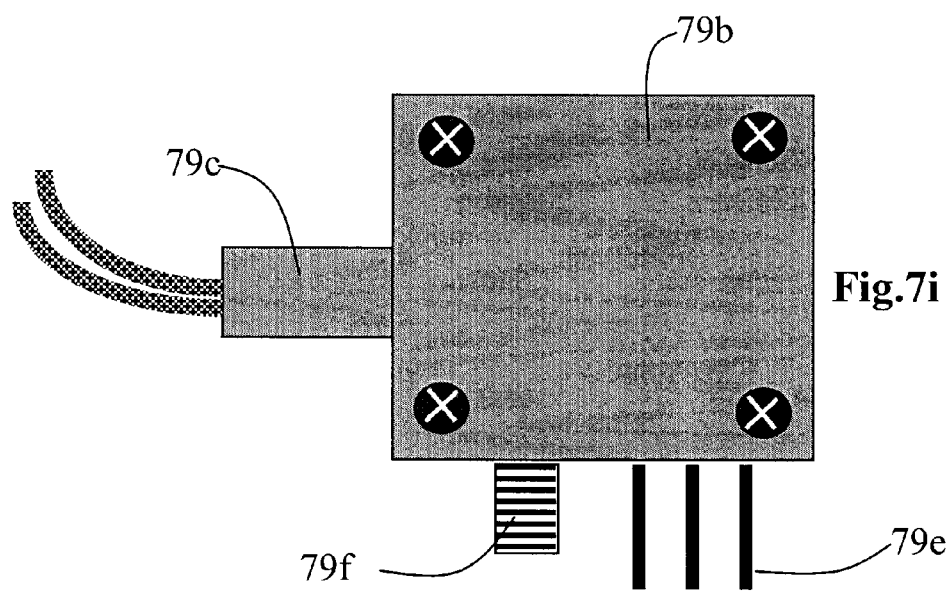

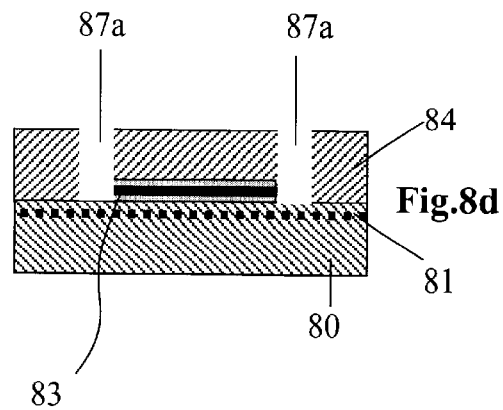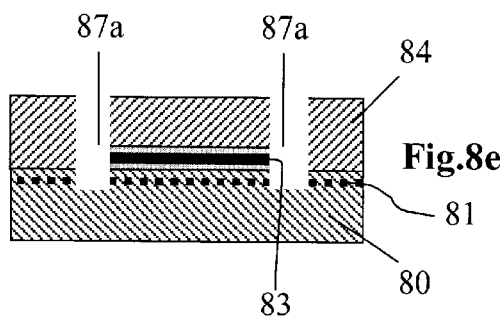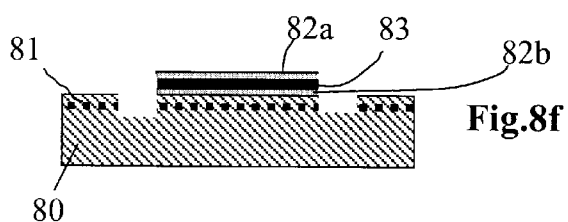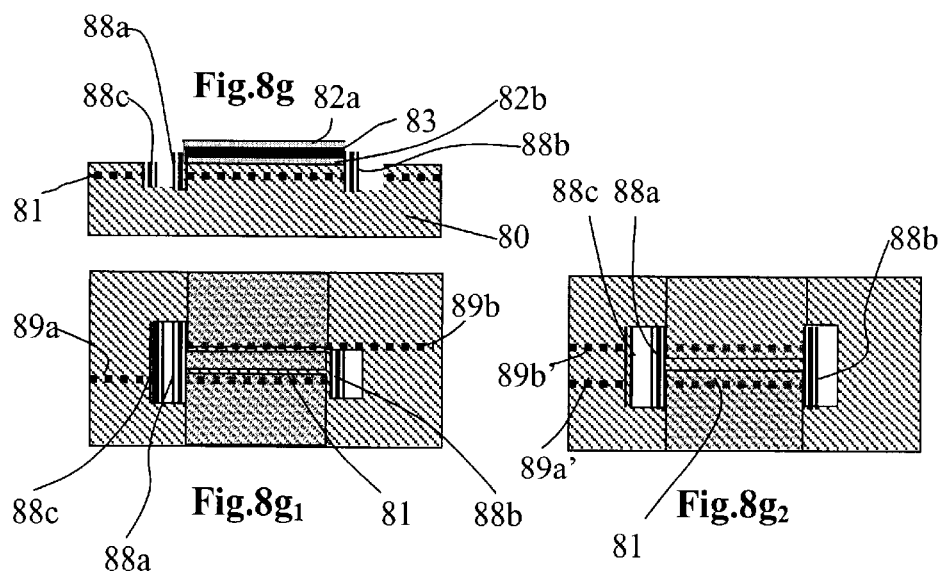

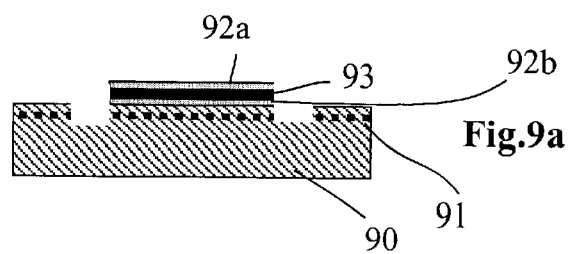
Fig.9a
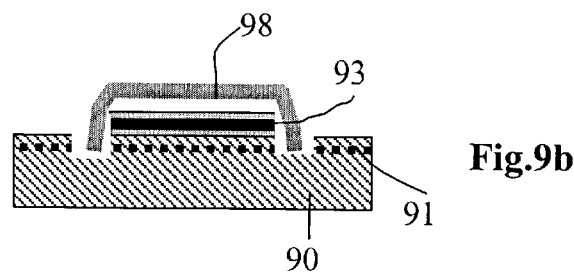
Fig.9b
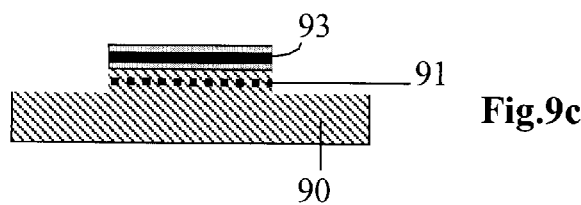
Fig.9c
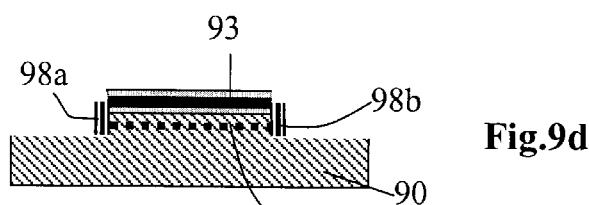
Fig.9d
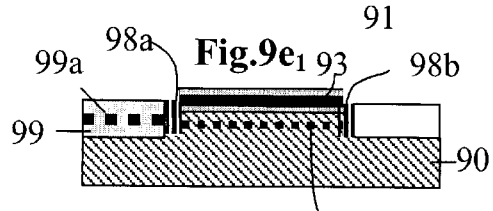
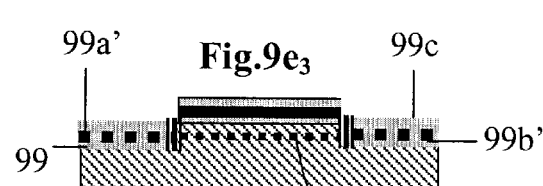
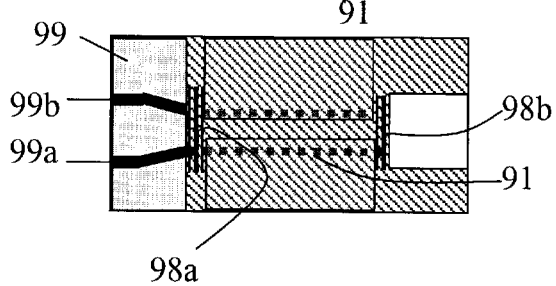
Fig.9e$_2$
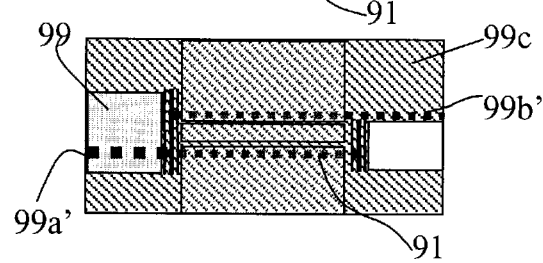
Fig.9e$_4$

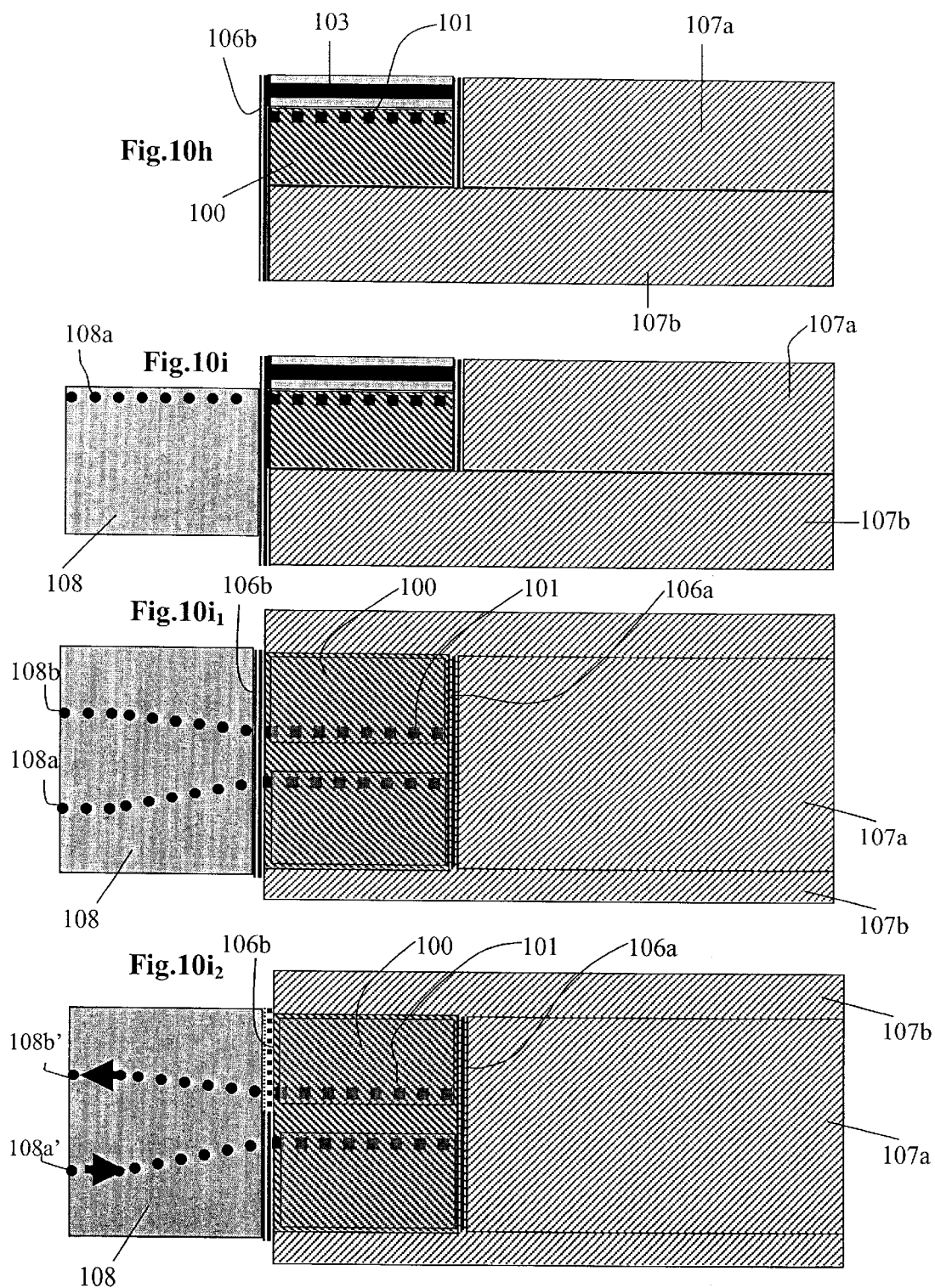

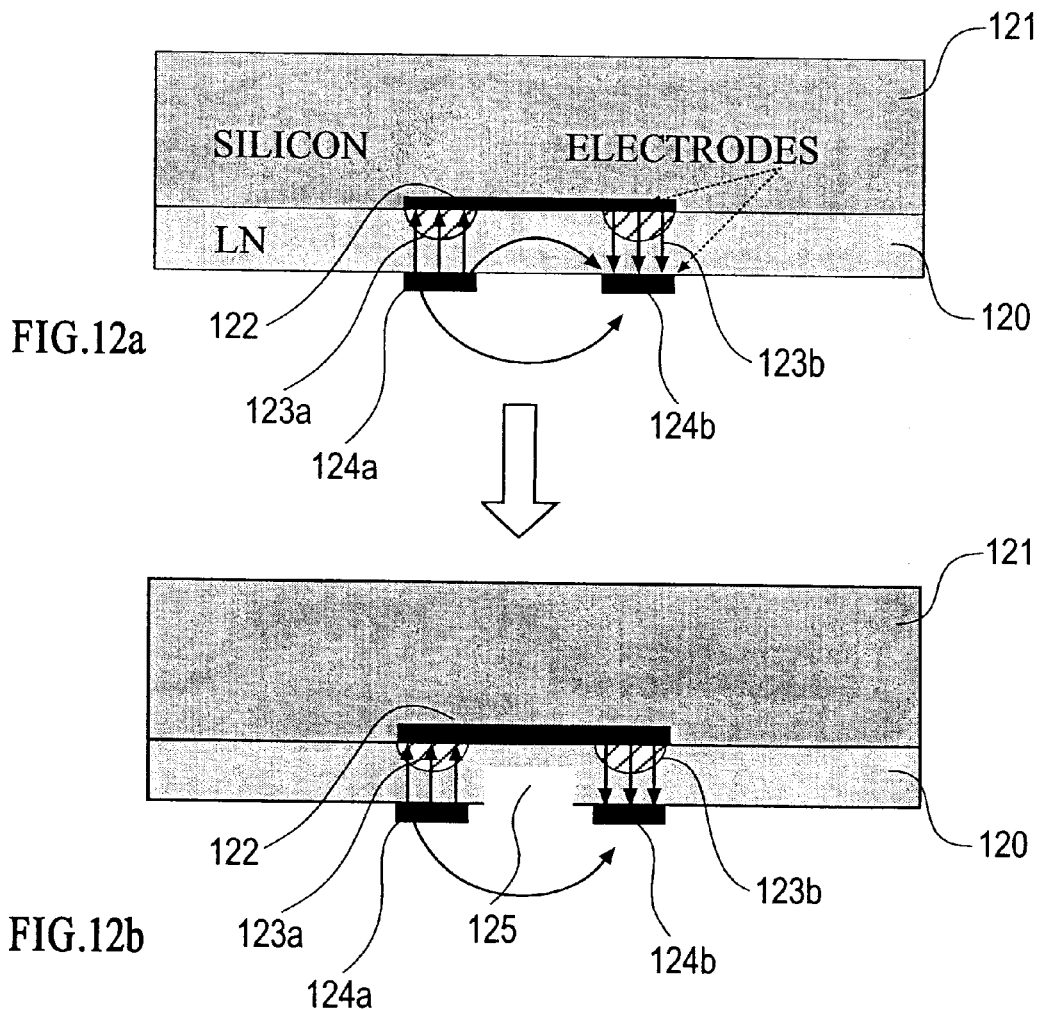

INTEGRATED OPTICAL DEVICES AND METHODS OF MAKING SUCH DEVICES

This application claims benefit of provisional application Ser. No. 60/186,359, filed May 16, 2000.

FIELD AND BACKGROUND OF THE INVENTION

The present invention relates to integrated optical devices, and also to methods of making such devices.

Integrated optical devices generally include a substrate formed with waveguide pathways each having a higher refractive index than the substrate for guiding the transmission of light therethrough, and a plurality of electrodes to receive electrical signals for controlling the light transmission through the pathways. The waveguide pathways in an interaction zone are of an electro-optically active waveguide material whose refractive index changes in response to electrical signals applied to the electrodes. Waveguide pathways in an access zone provide optical access to the interaction zone.

The invention is particularly useful in cavity-assisted directional-coupler devices in which the interaction zone includes an optical cavity having front and back ends defined by reflector facets perpendicular to the longitudinal axis of the optical cavity. The invention is therefore described below particularly with respect to this type of device, but it will be appreciated that the invention, or various aspects thereof, may also be used in other types of integrated optical devices.

Integrated optical devices are characterized by extremely short response times, in the sub-nano-second order, which makes them ideally suited in optical communications systems. Such devices generally, and cavity assisted directional-coupler devices in particular, are described in a large number of publications, including the Ph.D. thesis by the inventor in the present application: D. Nir, "Novel Integrated Optic devices Based On Irregular Waveguide Features", Ph.D. thesis, Tel Aviv University, 1996.

The extension of such devices to ever-increasing applications depends to a large degree on the operational efficiency attainable by such devices, and also on the complexity in fabricating such devices. Efforts are continuously being made to increase the operational efficiency of such devices, and to simplify their fabrication, in order to extend their use to many additional applications.

For example, a fundamental feature of cavity-assisted directional-couplers is a very short optical cavity, typically 25–250 µm in length. The cavity is created when two reflectors confine a waveguide section.

The reflector structures, in particular at the input side, are generally trench structures created by etching out material, as by reactive-ion-beam etching (RIBE). The reflector facets must be perfectly flat, smooth and perpendicular to the optical cavity in order to minimize cavity losses because of scattering by imperfections. The back facet of the front trench is coated with a semi-reflecting film to input the light, whereas the front facet in the back trench is coated with a fully reflecting film to produce total reflection through the optical cavity between the latter two films.

Because of the trench structure produced by etching, the front facet of the front trench (facing the input waveguide) is coated with an anti-reflecting film to improve the light transmission. However, providing such a film adds to the complexity of fabrication; it also contributes to the optical losses in such devices.

OBJECTS AND BRIEF SUMMARY OF THE INVENTION

An object of the present invention is to provide integrated optical device of the foregoing type, and methods for making them, to improve the operational efficiency of the devices, and/or to reduce the complexity in their fabrication.

According to one aspect of the present invention, there is provided an integrated optical device, comprising: a substrate including waveguide pathways each having a higher refractive index than the substrate for guiding the transmission of light therethrough, and a plurality of electrodes to receive electrical signals for controlling the light transmission through said pathways;

the waveguide pathways being included in an interaction zone and being of an electro-optically active waveguide material whose refractive index changes in response to electrical signals applied to the electrodes; the waveguide pathways also being included in an access zone providing optical access to the interaction zone; characterized in that the active waveguide material in the interaction zone is a different material from the waveguide material in the access zone.

As will be described more particularly below, this broad aspect of the invention enables a number of techniques to be used for improving the operating efficiency of such devices, as well as for reducing the complexity in their fabrication.

According to another aspect of the present invention attainable by the above feature, there is provided an integrated optical device of the optical cavity type characterized in that the reflector facets for the optical cavity (or cavities) are defined by trenchless formations in the substrate and consist only of a semi-reflecting facet at the front end of the optical cavity and a fully-reflecting facet at the back end of the optical cavity. Such a construction, obviating the need for trenches and an anti-reflecting facet at the inlet end of the optical cavity, not only enables the operation efficiency of the device to be improved by eliminating optical losses in the anti-reflecting coating on the front facet of the front trench, but also enables the fabrication of such devices to be simplified.

According to another aspect of the present invention also attainable by the foregoing feature the invention provides cavity-assisted directional couplers including a single optical cavity on the interaction zone, characterized in that both the input waveguide pathway and the output waveguide pathway are coupled to the optical cavity on the same side of the substrate, as distinguished from the prior art constructions, as described below (and illustrated in FIG. 1a) wherein they are on opposite sides of the substrate. Such a feature may be highly desirable in many designs to increase the flexibility and/or compactness of the design.

According to another aspect of the present invention, there is provided a method of making a cavity-assisted directional-coupler in which the interaction zone includes an optical cavity having front and back ends defined by reflector facets perpendicular to the longitudinal axis of the optical cavity produced by dicing and polishing, rather than by precise etching. As will be described more particularly below, such a method enables attaining both an increase in the operating efficiency of the device, as well as a reduction in the complexity of its fabrication.

According to another aspect of the present invention, there is provided an integrated optical device characterized in that a second substrate is bonded to the substrate formed with the interaction zone waveguide pathways and is of a material having a higher heat capacity than the material of the latter substrate so as to serve as a heat sink for that substrate. Such a construction permits the substrate including the waveguide pathways to be made of a first material, such as $LiNbO_3$, having a relatively low heat capacity and a relatively high thermal sensitivity, and the second substrate to be made of a material, such as silicon, having a high heat capacity so as to serve as a heat sink for the first substrate and thereby to minimize its temperature change during the operation of the device.

According to a still further aspect of the present invention, there is provided a method of producing an integrated optical device including waveguide pathways defining an optical cavity of an interaction zone, and waveguide pathways in an access zone; the method comprising: forming the waveguide pathways of one zone in a first substrate; bonding the first substrate to a second substrate to embed the waveguide pathways; etching one of the substrates to produce perpendicular facets at the front and back ends of the optical cavity of the interaction zone; and applying reflector coatings to the perpendicular facets.

In the preferred embodiment of the invention described below, the second substrate is silicon and is etched to form a mask for etching the first substrate to produce the waveguide pathways of the interaction zone, and particularly the perpendicular facets at the opposite ends of the optical cavity. Since silicon is easily etchible by conventional wet etching techniques, as distinguished from $LiNbO_3$ which generally requires reactive ion beam etching (RIBE), this aspect of the invention enables relatively perfect reflector facets to be produced at the opposite ends of the optical cavities by wet etching rather than by RIBE.

Further features and advantages of the invention will be apparent from the description below.

BRIEF DESCRIPTION OF THE DRAWINGS

The invention is herein described, somewhat schematically and by way of example only, with reference to the accompanying drawings, wherein:

FIGS. 1a and 1b are top views of a single cavity device SCD and double cavity device (DCD), respectively, of the prior art;

FIG. 1c is a side view illustrating the construction of such prior art devices;

FIGS. 2a and 2b are top and side views, respectively, of the prior art devices more particularly illustrating the electrodes thereof;

Figure 3:
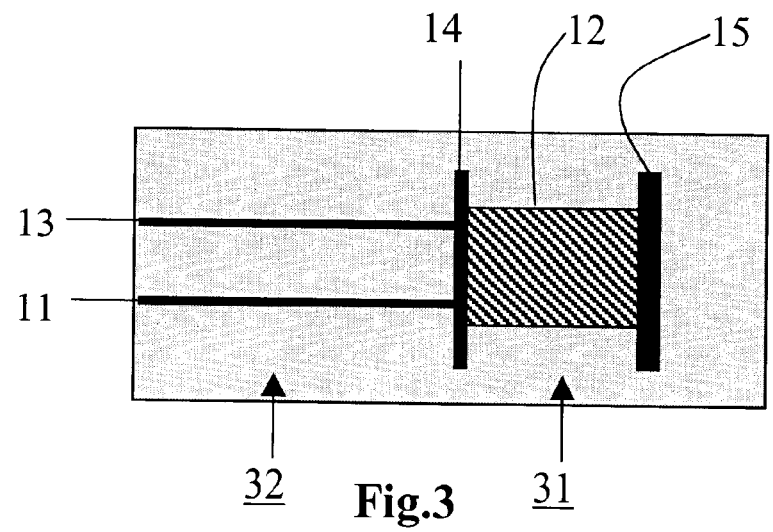
FIG. 3 is a top view illustrating an integrated optical device constructed in accordance with one aspect of the present invention.

FIGS. $4a–4i_2$ illustrate various stages in one method for manufacturing an integrated optical device in accordance with the present invention;

FIGS. $5a_1–5e_3$ illustrate various stages in a second method of manufacturing such devices in accordance with the present invention;

FIGS. $6a_1–6h_2$ illustrate various stages in a third method of manufacturing such devices in accordance with the present invention;

FIGS. $7a_1–7i$ illustrate various stages in a fourth method of manufacturing such devices in accordance with the present invention;

FIGS. $8a–8g_2$ illustrate various stages in a fifth method of manufacturing such devices in accordance with the present invention;

FIGS. $9a–9e_4$ illustrate various stages in a sixth method of manufacturing such devices in accordance with the present invention;

FIGS. $10a–10i_2$ illustrate various stages in a seventh method of manufacturing such devices in accordance with the present invention;

FIGS. 11a–11h illustrate various stages in an eighth method of manufacturing such devices in accordance with the present invention; and FIGS. 12a and 12b illustrate a further advantageous feature of the present invention.

BRIEF DESCRIPTION OF PRIOR ART DEVICES

FIGS. 1a and 1b are top views schematically illustrating the two main type of known cavity devices, namely: a single cavity device (SCD) illustrated in FIG. 1a, and a double-cavity device (DCD) illustrated in FIG. 1b. FIG. 1c is an enlarged view schematically illustrating the construction of the optical cavity in either of these devices.

Thus, as shown in FIG. 1a, the SCD includes a substrate 10 provided with a plurality of waveguide pathways each having a higher refractive index than the substrate for guiding the transmission of light therethrough. The SCD in FIG. 1a includes an input waveguide pathway 11 on one side of the substrate, a single optical cavity 12, and an output waveguide pathway 13 on the opposite side of the substrate; whereas the DCD of FIG. 1b includes an input waveguide pathway 11, two optical cavities 12a, 12b, and an output waveguide pathway 13 on the same side as input waveguide pathway 11.

FIG. 1c schematically illustrates the construction of the optical cavity 12 in the SCD of FIG. 1a, or in each of the two optical cavities 12a, 12b in the DCD of FIG. 1b. In the conventional cavity devices, each optical cavity 12 is defined by a front trench 14 and a back trench 15 at the opposite ends of the waveguide pathway defining the optical cavity 12. The front facet of the front trench 14 is provided with an anti-reflecting coating 14a; the back facet of the front trench 14 is provided with a semi-reflecting coating 14b; and the front facet of the back trench 15 is provided with a fully-reflecting coating 15a.

Thus, the light transmitted through the inlet waveguide pathway 11 passes through coatings 14a and 14b to enter the optical cavity 12 and is reflected back through the optical cavity by the reflecting coating 15a. When the optical length of the cavity is properly phase tuned, the introduced light is amplified to a level depending on the structure parameters. The light in the optical cavity 12 is coupled directly to the output waveguide 13 in the SCD of FIG. 1a, and via the second optical cavity (12b) to the output waveguide 13 in the DCD of FIG. 1b.

The transmission state of the device is controlled by electrical signals applied to electrodes carried by the device. The electrical field produced by these electrical signals applied to the electrodes changes the refractive index of the waveguide material at the interaction zone, i.e., the optical cavity 12 and the outlet waveguide 13 coupled to it in the SCD of FIG. 1a, or the two optical cavities 12a, 12b in the DCD of FIG. 1b. This change in the refractive index is produced by the electro-optic effect and enhances or reduces power transfer-rate between the input and output waveguide pathways 11, 13.

FIGS. 2a and 2b are top and side views, respectively, illustrating a DCD including such electrodes in the interaction zone of the two optical cavities 12a, 12b. The illustrated construction includes two outer electrodes 21, 22 overlying the outer region on opposite sides of the two optical cavities 12a, 12b, and an inner electrode 23 overlying the inner region between the two cavities. All three electrodes 21, 22, 23 are coplanar and are insulated from the waveguide layer by a dielectric buffer layer 24.

Since such integrated optical devices are well known and extensively described in the literature, further details of the construction or operation of these devices are not set forth herein. The literature describes many electro-active materials which may be used, including $LiNbO_3$ (lithium-niobate), GaAs (gallium arsinide), InP (indium phosphide), silicon and electro-optic (EO) polymers.

DESCRIPTION OF THE BROAD CONCEPTS OF THE INVENTION

FIG. 3 illustrates one broad concept of the present invention, namely of using one material for the waveguide pathways in the interaction zone and a different material for the waveguide pathways in the access zone.

For purposes of example, FIG. 3 illustrates a double cavity device (DCD) corresponding to the prior art FIG. 1b, including an input waveguide pathway 11; a pair of optical cavities, generally designated 12, confined between a front reflector facet 14 and a back reflector facet 15; and an output waveguide pathway 13. It will be seen that the optical cavities 12a, 12b occupy an interaction zone, generally designated 31, which controls the transmission state of the device in accordance with electrical signals applied to their electrodes (corresponding to electrodes 21–23, FIG. 2a); while the two waveguide pathways 11 and 13 occupy an access zone, generally designated 32, providing optical access to the interaction zone 31.

Whereas in the prior art, the waveguide material in the access zone 32 was generally the same as in the interaction zone 31, according to one important aspect of the present invention the materials are different in the two zones. Thus, the waveguide material in the interaction zone 31 must be electro-optically active, i.e., one whose refractive index changes in response to electrical signals applied to the electrodes; while the material in the access zone 32 need not be electro-optically active but rather can be electro-optically passive, since the function of these waveguides is merely to provide optical access to the interaction zone.

As will be described more particularly below with respect to specific embodiments of the invention selected for purposes of example, the foregoing concept enables many important advantages to be attained, including the following:

(a) improved facet quality in the trench reflectors, thereby adding to the transmission quality of the device;

(b) improved electro-optical efficiency, thereby reducing the electrical drive power required; and/or:

(c) improved thermal stability, thereby enabling one waveguide material having high heat capacity to be used as a heat sink for the other waveguide material having good electro-optical properties but also a high thermal sensitivity to temperature changes.

While the foregoing is broadly an important concept of the present invention, the invention also involves several other concepts all stemming from this broad concept, as will be brought out in the description below of several methods of making integrated optical devices in accordance with the present invention.

DESCRIPTION OF PREFERRED EMBODIMENTS

For purposes of illustrating the various aspects and the scope of the invention, the invention is described below with respect to a number of examples constituting preferred embodiments of the invention at the present time.

EXAMPLE 1

(FIGS. $4a$–$4i_2$)

Figure 4A:
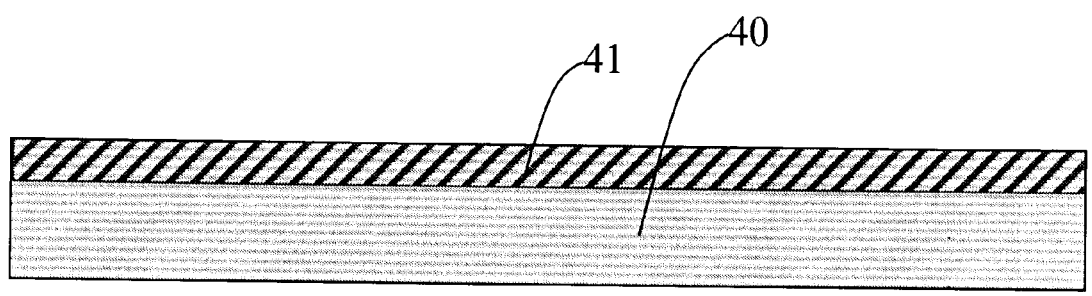

This example utilizes a silicon wafer 40, as illustrated in FIG. 4a, with <110> orientation as purchased from the vendor. Such a wafer is typically 400 $\mu$m thick and is provided with a top layer 41 doped in a manner to form an index step for light waves at wavelength over ~1100 nm; therefore, light injected into layer 41 propagates in it and does not escape into the bulk of the substrate.

The waveguide layer 41 is first patterned by photolithography and etched selectively, e.g., by RIE (reactive ion etching) or by RIBE (reactive ion beam etching) to define the waveguide channels in the access zone (32, FIG. 3), typically supporting propagation of the fundamental mode. The cavity in the interaction zone (31, FIG. 3) is then patterned and chemically "wet" etched (typically a KOH bath) to form the front and back facets of the cavity with a high degree of flatness, smoothness and perpendicularity. FIGS. $4b_1$ and $4b_2$ are side and top views, respectively, illustrating the results at this stage of the method producing the input waveguide pathway 42, the output waveguide pathway 43, and the cavity 44 between the flat, smooth, and perpendicular facets 44a, 44b, at the front and back ends, respectively, of the cavity.

In the next processing step, the two cavity facets 44a, 44b are coated with their respective reflecting coatings 45a, 45b, as shown in FIG. 4c, (side view) and FIG. $4c_2$ (top view). These coatings may be either metallic (single film), or dielectric multi-layer pair stacks (alternating paired index sequence: n1, n2: n1, n2; n1, n2 - - - ) as known in the art. A dielectric coating has lower losses and can also be designed to admit a specified spectral window. As described above, the front facet coating 45a is semi-reflecting, whereas the back facet coating 45b is fully reflecting.

The next processing step involves the formation of the various elements in the interaction zone within cavity 44, as illustrated in FIGS. $4d_1$–$4d_3$. Thus, FIG. $4d_1$, which is an enlarged fragmentary view, illustrates the isolating dielectric buffer layer 46 which is first applied, and then the metal electrode 47 deposited thereover. Electrode 47 serves as a common bottom electrode for the three coplanar electrodes 21–23 of FIG. 2a. FIGS. $4d_2$ and $4d_3$ are side and top views, respectively, schematically illustrating the device at this stage.

The next step involves the application of the electro-optically active waveguide material, as shown FIGS. $4e_1$–$4e_3$, over the electrodes 47. As seen in the enlarged fragmentary view of FIG. 4e, and the side view of FIG. $4e_2$, the electro-optically active waveguide material is in a middle core covered by a bottom cladding 48a and a top cladding 48b; and as seen in the top view of FIG. $4e_3$, it defines a pair of optical cavities between the reflector facets 45a, 45b. Waveguide material 48 is preferably an electro-optically active polymer (EO polymer).

FIG. 4f is an enlarged sectional view more particularly illustrating the various elements within the cavity 44, namely the dielectric buffer 46, the bottom electrode 47, and the EO polymer 48 in the form of two parallel optical cavities, and the bottom and top claddings 48a, 48b of the EO polymer 48.

As an example, the bottom cladding 48a may be a passive material spun, cured and trimmed to proper thickness by RIE or by RIBE; the EO polymer 48 may be spun, cured, trimmed and than patterned to define the two optical cavities; and the top cladding 48b may be a passive material applied to fill the space between the EO polymer 48, as well as topping it typically by 2 μm, cured and trimmed.

The next processing step, as illustrated in the side and top views of FIGS. $4g_1$, $4g_2$, respectively, produce the top electrodes 49, e.g., patterned to correspond to the three coplanar electrodes 21–23 in FIG. 2a. These top electrodes may be applied by a conventional photolithographic technique, e.g., by photoresist patterning, vacuum deposition (of metals), electroplating, etching, etc.

The top electrodes 49 have two functions: (1) initially, to pole the EO polymer 48 defining the two optical cavities in the interaction cavity zone 44; and (2) operationally, to control the transmission state of the optical device.

Poling is required for creating un-isotropic polarization in the polymer in order to make it electro-optically active. Poling is typically carried out at a field of 3.5 V/μm and at 300° C. Cooling the material with the field still applied fixes the polarization; and the direction of the field lines determines the polarization orientation.

The top electrodes 49 may also be used for controlling the transmission state of the device. As known in the art, other electrode arrangements may be provided for this purpose.

The integrated optical device may then be completed and packaged to provide a packaged device as illustrated in the side view of FIG. $4h_1$ and the top view of FIG. $4h_2$, to include a platform 49a to which the substrate 40 is bonded; a metallic casing 49b housing the device; input and output lead-through waveguides 49c, 49d; r.f. feedthroughs 49e bonded to the electrodes; and an electrical feedthrough 49f. These operations can be performed by conventional techniques.

FIGS. $4i_1$ and $4i_2$ are side and top views. respectively, illustrating a possible modification to this method. In this modification, instead of forming the access waveguides (e.g., 42, 43) from the waveguide layer 41 of the silicon wafer 40, these access waveguides may be formed of the same polymer as the waveguides in the interaction zone, except they would not be poled to make them electro-optically active.

Thus, as shown in FIGS. $4i_1$ and $4i_2$, the initial silicon wafer 40 need not be provided with a waveguide layer 41, but rather can be formed with a narrow upwardly-projecting strip 41a and a larger upwardly-projecting strip 41b to define between them the facets at the opposite ends of the cavity zone 44.

Strips 41a should be typically 3–10 μm wide so that the propagating wave will sense only a minor disturbance between the interfaces; with wider dimensions, the beam will spread and scatter away from the path.

The semi-reflecting coating 45a at the front end of the cavity zone 44 would be applied to the back face of strip 41a, and the fully-reflecting coating 45b at the back end of the cavity zone would be applied to the front face of the upwardly-projecting strip 41b. However, in this case an anti-reflecting coating 45c would be applied to the front face of strip 41a. After the above reflecting coatings have been applied to the opposite ends of the cavity zone 44, an electro-optically active waveguide material, such as an EO polymer, may be applied in the interaction cavity zone 44 to define the pair of optical cavities (48, FIG. 4f); and also in the access zone to define the two waveguide pathways (42, 43 FIG. $4b_2$).

It will thus be seen that this modification eliminates a patterning step, but requires an additional coating step for coating the anti-reflection layer 45c on the access zone facet (front facet of strip 41a). Also, since there are no silicon waveguides, the original silicon substrate is not required to have a waveguide layer. All the other steps described above with respect to this method would also apply to this modification.

It will be appreciated that the foregoing method provides a number of important advantages over the prior art, including the following:

The method, except for the modification of FIGS. $4i_1$, $4i_2$, produces trenchless formations at the front and back ends of the optical cavity, and therefore obviates the need for the anti-reflection coating at the front end of the optical cavity, thereby simplifying the fabrication process as well as reducing optical losses. With respect to the modification of FIGS. $4i_1$, $4i_2$, while the anti-reflecting coating is required, the fabrication process is simplified by eliminating one of the patterning steps.

In addition, employing different waveguide materials for the interaction zone and each zone, the access zone may be made of a material which has superior characteristics for its respective function. For example, by making the waveguide material in the access zone of silicon (<110>), wet etching of the (111) facets produces perfectly perpendicular, flat, and smooth facet surfaces. In addition, by applying the electro-optically active waveguide material in the interaction zone, this material may be applied to tightly fill the space between the reflector facets, thereby to produce trenchless formations, and also to become automatically aligned wit the facets. In addition, improved thermal stability may be obtained by using a relatively thick substrate having high heat capacity, such as silicon, for the access zone, and a relatively thin layer, such as an EO polymer, for the interaction zone.

While the method described above utilizes silicon as the substrate and also as the waveguide material in the access zone, with an EO polymer as the waveguide material in the interaction zone, it will be appreciated that other materials and combinations can be used according to particular applications. For example, the substrate may also be $LiNbO_3$, GaAs, or InP; the active waveguide material in the interaction zone may be the same as that of the substrate; and the waveguide material in the access zone may be a polymer, silicon or $SiO_2$.

EXAMPLE 2

(FIGS. $5a_1$–$5e_3$)

In this example, the formation of the waveguide pathways in the interaction zone and access zone is reversed as compared to the above-described Example 1 method. That is, in this Example 2 method, the waveguide pathways in the interaction zone are first formed with the reflector facets of the optical cavity, and then the waveguide pathways in the access zone are formed.

FIGS. $5a_1$ and $5a_2$ are side and top views, respectively, illustrating the starting substrate 50, in this case lithium niobate. The first step, shown in FIGS. $5a_1$, $5a_2$, is to form the waveguide pathways in the interaction zone, namely the two optical waveguides 51a, 51b.

These waveguide pathways may be formed by conventional techniques, e.g., by Ti indiffusion. Waveguide pathways 51a, 51b are thus made of electro-optically active waveguide material and constitute the interaction zone of the device.

The next step is to form the electrodes. FIGS. $5b_1$ and $5b_2$ are side and top views, respectively, illustrating this step in the process, wherein the waveguide pathways 51a, 51b are first covered by a thin dielectric buffer film 52 (typically SiO$_2$), and then by a metal film 53a, 53b (typically gold).

FIGS. 5c$_1$, 5c$_2$ are side and top views, respectively, illustrating the next step, which involves the formation of the facets 54a, 54b, at the opposite ends of the waveguide pathways 51a, 51b for producing the mirror facets confining the optical cavities defined by pathways 51a, 51b. Preferably, the facets 54a, 54b are produced by RIBE.

FIGS. 5d$_1$, 5d$_2$, are side and top views, respectively, illustrating the next step in this method, namely the application of the reflector coatings 55a, 55b to the facets 54a, 54b. These coatings may be metal films, but preferably are dielectric multi layer pair-stacks vacuum deposited on the facets 54a, 54b.

FIGS. 5e$_1$–5e$_3$ illustrate the next stage in this method, namely the application of the waveguide material in the access zone of the device. As shown particularly in the enlarged fragmentary illustration of FIG. 5f$_1$, this waveguide material includes a core 56 with bottom and top claddings 56a, 56b. The bottom cladding 56a is first deposited, followed by the deposition of the core layer 56 patterned according to conventional techniques to define the input and output waveguide pathways 57, 58, followed by the deposition of the top cladding layer 56b.

The fabrication of the optical device may then be completed in any conventional manner, or as described above with respect to Example 1.

It will be seen that this Example 2 also provides a number of important advantages over the conventional techniques, including elimination of the trench formation for the input mirror, thereby obviating the need for the anti-reflecting coating in the front cavity facet, among the many other advantages described above with respect to the first method.

EXAMPLE 3

(FIGS. 6a$_1$–6h$_2$)

In this example, a substrate 60, such as lithium niobate, is processed in the same manner as in the first two steps of Example 2 described above to produce the two waveguide pathways 61, the dielectric film 62, and the two electrodes 63, as illustrated in the side views of FIGS. 6a, 6b$_1$, and their corresponding top views FIGS. 6a$_2$, 6b$_2$.

Figure 6C:
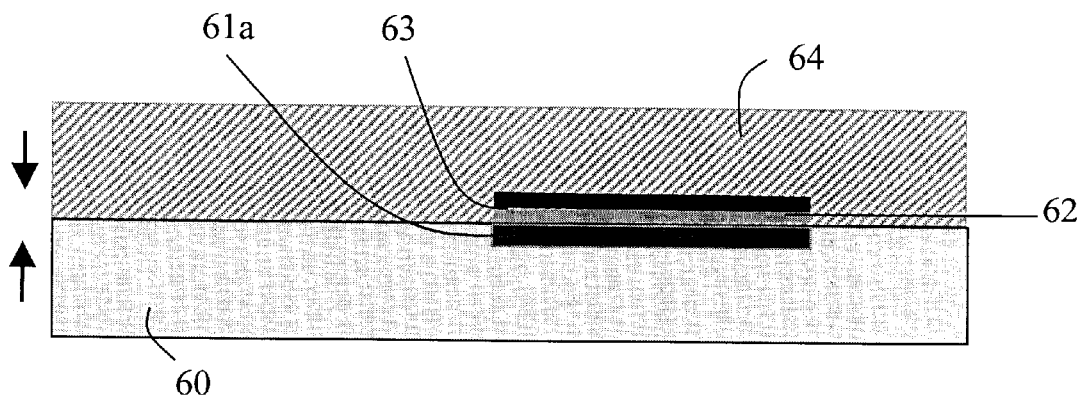

The face of the lithium niobate substrate 60 carrying the waveguide pathways 61 and electrodes 63 is then bonded and fused to a silicon substrate 64 to embed the foregoing elements in the bonded faces of the two substrate, as shown in FIG. 6c.

Figure 6D:
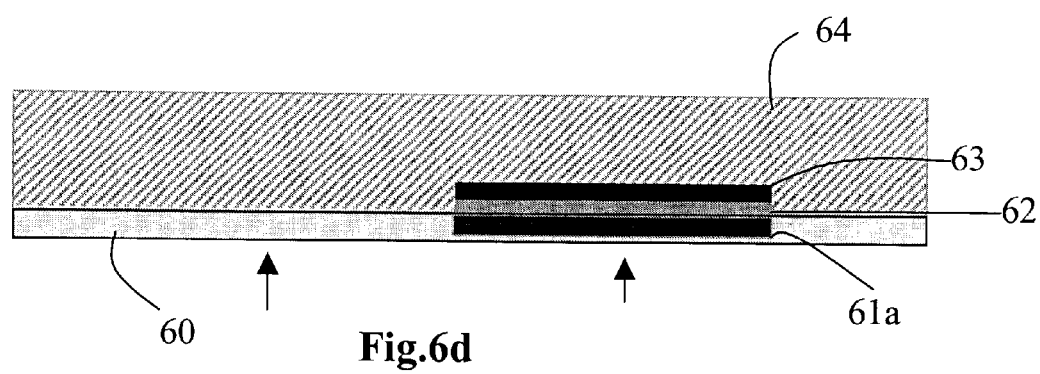
Figure 6E:
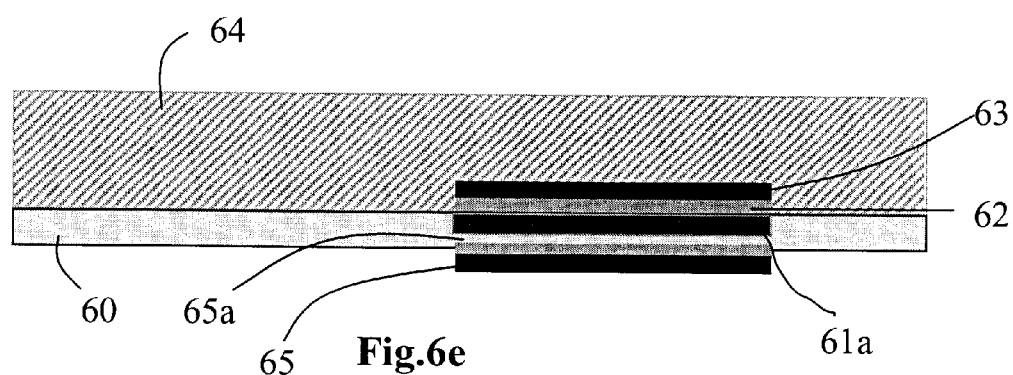

The lithium niobate substrate 60 is then thinned to a thickness of about 5–7 µm, e.g., by mechanical or chemical means (FIG. 6d). A thin buffer film 65a is then applied, and additional electrodes 65 are patterned thereon (FIG. 6e).

The foregoing layers are then subjected to an etching process, e.g., RIBE, to define the cavity facets 66a, 66b. At the same time, the etching process removes the thinned lithium niobate of the original substrate 60 except for the film between the two electrodes 63, 65, thereby exposing the silicon substrate 64 (FIG. 6f).

The reflector coatings 67a, 67b, are then applied to the two facets 66a, 66b to define the opposite ends of the two optical cavities produced by the waveguide pathways 61 in the interaction zone of the device (FIG. 6g).

The waveguide pathways of the access zone are then provided by bonding a substrate 68 of silicon, polymer or the like and patterning the input and output waveguide pathways 68a, 68b on the substrate in accordance with conventional techniques.

The result, as shown in the top and side views of FIGS. 6h$_1$ and 6h$_2$, is an optical device in which the two interaction zone waveguides 61 are of thin lithium niobate; the access waveguide pathways 68a, 68b are of silicon, polymer, or the like; and both waveguide pathways are bonded to a relatively thick base of silicon, which has high heat capacity. The silicon base therefore serves as a heat sink particularly for the waveguide pathways in the interaction zone, thereby substantially increasing the thermal stability of the optical device.

It will be appreciated that many of the other advantages described above are also attainable by this method.

EXAMPLE 4

(FIGS. 7a$_1$–7i)

The process illustrated in FIGS. 7a$_1$–7d$_2$ of this example is generally similar to that described above with respect to FIGS. 6a$_{1-6}$e of Example 3 to produce a silicon substrate 74, a bottom metal electrode 73, an active waveguide pathway 71, a thinned layer of lithium niobate 70, and a top metal electrode 75 generally, corresponding to elements 60–65 in Example 3, except both metal electrodes 73 and 75 are isolated on both faces by buffer layers 73a, 73b and 75a, 75b. FIG. 7d$_2$ illustrates the conductive deposit 76 serving as the connection to the electrode 75.

In this Example 4, however, the silicon substrate 74 is used as a mask for etching the facets at the opposite ends of the optical cavities defined by the waveguide pathways 71 in the interaction zone.

Thus, as shown in the side view of FIG. 7e$_1$ and in the top view of FIG. 7e$_2$, a photo resist mask 77 is applied to the outer face of the silicon substrate 74. This mask is used for etching the silicon substrate 74, as well as the opposite edges of the metal layers 73 and 75, to produce trenches 77a having a very high aspect ratio (width to depth). This etching may be effected either dry (e.g., by the RIE "Bosch Process"), or wet of (111) planes of <110> silicon to the thinned lithium niobate layer 70.

The thinned lithium niobate layer 70 may then be etched through the trenches 77a of the silicon substrate. The etching of the lithium niobate layer is greatly facilitated because of the high aspect ratio, smoothness and perpendicularity of the walls of the trenches 77a produced by etching the silicon substrate, such that smooth, flat and perfectly perpendicularity facets can be produced by using a suitable etchant, such as SF$_6$. This is shown in the side and bottom views of FIGS. 7f$_1$, 7f$_2$, respectively.

With the RIE process, the mask thickness is limited to 100–200 µm. However, a thicker mask could be used with the Ion-Beam-Milling process (Bombardment of the material with high energy ions, a hot chemical process like RIE/RIBE).

The reflecting coatings, in this case three coatings 78a, 78b and 78c may then be applied to define the reflector facets of the optical cavities in the waveguide pathways 71, as shown in FIGS. 7g$_1$, 7g$_2$. The reflecting coatings 78a–78c may be applied via photo resist masks from the lithium niobate layer 70 side of the silicon substrate 74.

The optical device may then be completed and packaged in the manner described above with respect to Example 1 (FIGS. 4i$_1$, 4i$_2$) to include a mounting base (not shown, corresponding to base 49a of FIG. 4$h_1$), a housing 79b corresponding to housing 49b, the input and output waveguide pathways 79c, 79d, the r.f. feedthrough 79e, and the electrical feedthrough 79f, as shown in FIGS. 7$h_1$, 7$h_2$ and 7i.

EXAMPLE 5

Figure 8A:
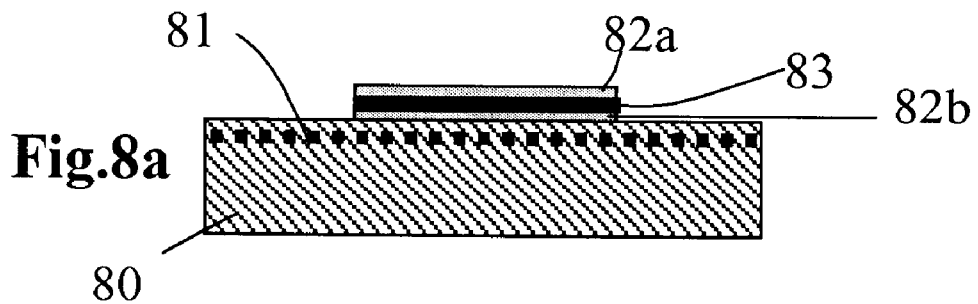
Figure 8B:
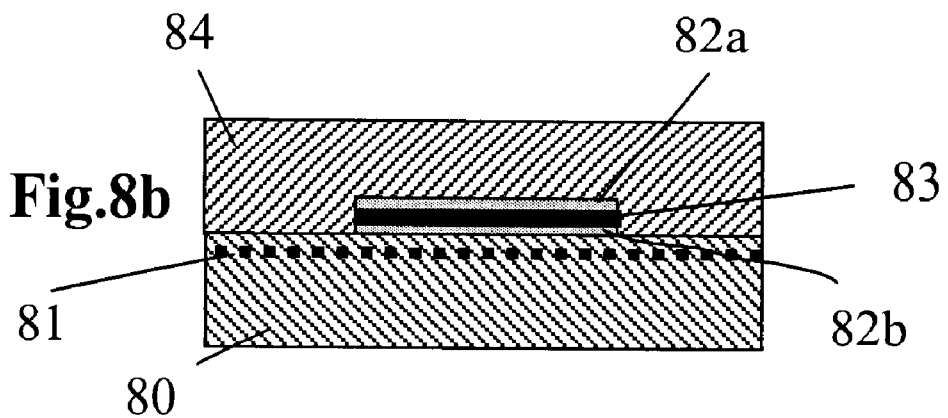
Figure 8C:
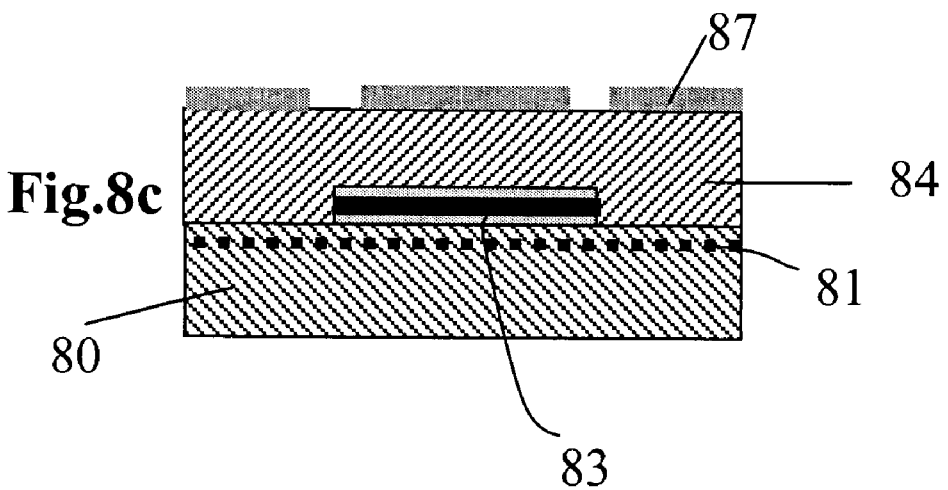

(FIGS. 8a–8$g_2$)

The first steps of the method in this example, as illustrated in FIGS. 8a–8e, are similar to the first steps in the method of Example 4, to produce the silicon substrate 84, the metal electrode 83, its buffer layers 82a, 82b, the waveguide pathway 81 and the lithium niobate initial substrate 80, with the trenches 87a being formed through the silicon substrate 84. In this case, however, the lithium niobate substrate 80 is not thinned; only its upper surface is etched; and the silicon substrate 84 is subsequently removed, as shown in FIG. 8f.

The reflector coatings 88a, 88b and 88c (FIG. 8g) are then applied to the facets defined by the trenches 87a to produce the reflector facets at the opposite ends of the interaction zone defined by the active waveguide pathways 81 on the lithium niobate substrate 80.

If the waveguide pathways 81 in the interaction zone define a single optical cavity to produce an SCC, the access zone would include an input waveguide pathway 89a on one side of the substrate, and an output waveguide pathway 89b on the opposite side, as shown in FIG. 8g, and as described above with respect to FIG. 1a. On the other hand, if the waveguide pathway 81 in the interaction zone defines two parallel optical cavities, as shown in FIG. 1b, the input waveguide pathway and the output waveguide pathway in the access zone would be on the same side of the substrate, as shown at 89a' and 89b' in FIG. 8$g_2$.

EXAMPLE 6

(FIGS. 9a–9$e_4$)

This method involves the same sequence of steps as shown in FIGS. 8a–8f of Example 7 to produce the lithium niobate substrate 90 carrying the waveguide pathway 91 in the interaction zone, the metal electrode 93, and its buffer layers 92a, 92b, as shown in FIG. 9a.

In this method, however, a photoresist mask 98 is applied over the above-described elements in the interaction zone (FIG. 9b). The masking by photoresist of the interaction zone permits: (1) applying the reflective coatings; and (2) processing the access waveguides. The flat facets (of the mirrors) were produced at an earlier stage.

The access waveguides may then be applied by applying another substrate 99 (e.g., of silica or a polymer to one side of substrate 80, to produce a double cavity device (DCD) in which the input and output waveguide pathways 89a, 89b are located on the same side of substrate 80, as shown in FIGS. 9$e_1$ and 9$e_2$; or a single cavity device (SCD), as shown in FIGS. 9$e_3$, 9$e_4$. FIGS. 9$e_3$, 9$e_4$ illustrate the input and output waveguide pathways 99a', 99b' on opposite sides of substrate 90 (output waveguide pathway 99b' being formed in a separate substrate 99c applied to the opposite side of substrate 90), but it will be appreciated that it could also be on the same side as described in Example 5.

All the foregoing Examples 1–6 involve the need for precise etching in order to produce the required smooth, flat and perpendicular reflector facets at the opposite ends of the cavity, or pair of cavities, in the interaction zone. Such precise etching is critical to avoid loss of optical power, and is particularly difficult with respect to certain materials that may otherwise have optimum properties for integrated optical devices. Moreover, in many of these methods, the reflector facets required trench formations at the opposite sides of the optical cavity or cavities, and therefore need, besides the normal front semi-reflecting coating and the back fully-reflecting coating, also an anti-reflecting coating at the inlet side of the optical cavity, which not only increases the complexity of the fabrication process, but also contributes to optical power losses.

Figure 10A:
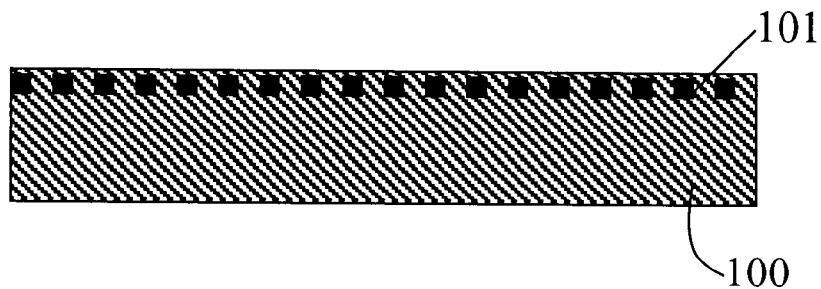

FIGS. 10a–11$i_2$ describe two examples of methods for making integrated optical devices in accordance with the present invention, which obviate the need for precise etching to produce the required reflector facets at the opposite ends of the interaction zone. In the following two methods, the high-quality reflector facets are produced, not by precise etching, but rather by cutting or dicing a substrate formed with waveguide pathways of one of the zones (e.g., the interaction zone), polishing the cut edges, applying the reflector coatings to the polished edges, and then bonding the substrate to another substrate to provide waveguide pathways of the other zone (e.g., the access zone).

EXAMPLE 7

(FIGS. 10a–10$i_3$)

Figure 10B:
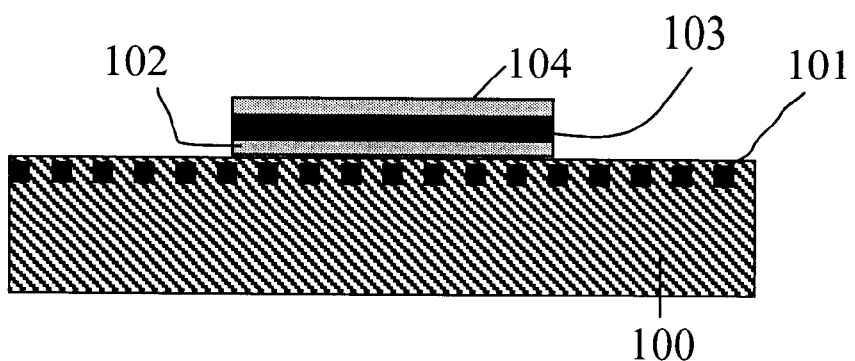

In this method, a lithium niobate substrate 100 is patterned to define waveguides 101; and at the interaction zone, the electrode layer is Applied by first applying a buffer coating 102, the patterned electrode layer 103, and an overlying buffer layer 104 (FIG. 10b).

Figure 10C:
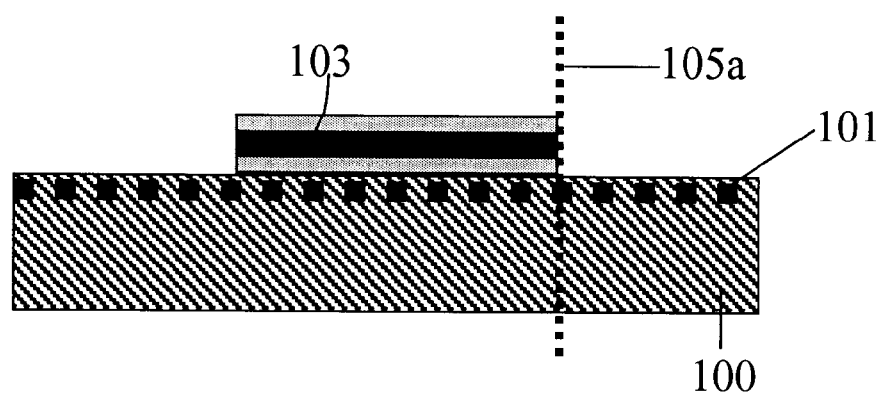
Figure 10D:
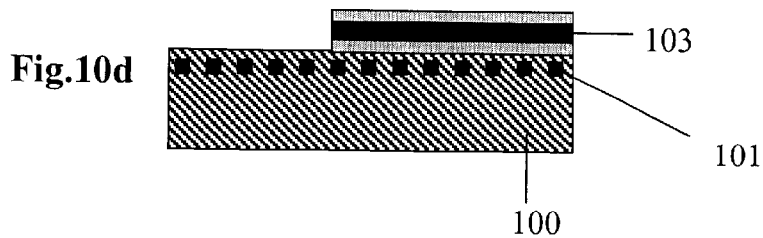
Figure 10E:
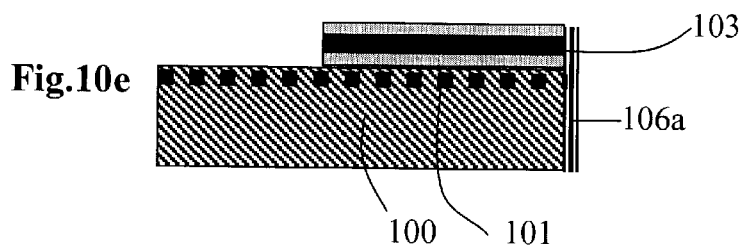

As shown in FIG. 10c, the back end of the interaction zone is then cut or diced along a line 105 perpendicular to the longitudinal axis of the optical cavity to be produced in that zone. The diced edge is then polished, as shown in FIG. 10d, and the back reflector coating 106a is applied as shown in FIG. 10e.

Figure 10F:
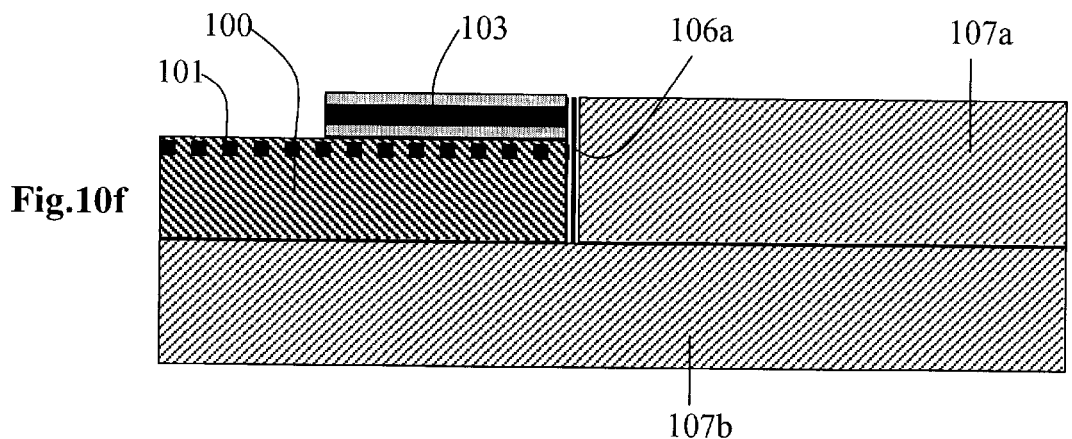
Figure 10G:
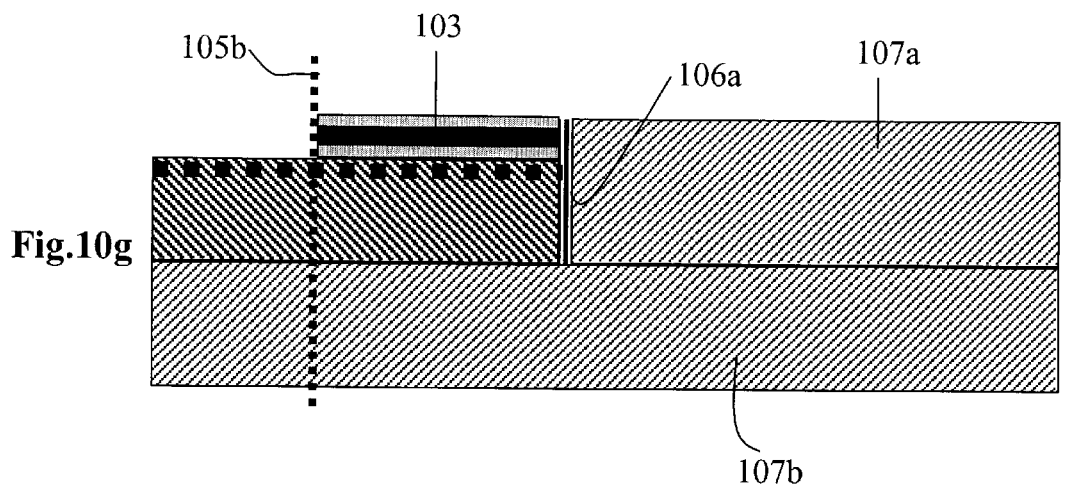

Another substrate 107a (e.g., silicon) is then bonded to that face of substrate 100, and a further substrate 107b (e.g., also of silicon) is bonded to the underface of both substrates 100 and 107a (FIG. 10f). The resulting block is then cut along another perpendicular line 105b (FIG. 10g) to define the front facet of the interaction zone. The front facet is then polished and coated with the front reflector coating 106b (FIG. 10h).

A further substrate 108 (e.g., also of silicon or of silica, a polymer, etc.) is then bonded to this face, as shown at FIG. 10i, to define the access waveguide pathways for the optical device.

FIG. 10i illustrates a double cavity device (DCD) wherein the input waveguide pathway 108a and the output waveguide pathway 108b are on the same side of the substrate, as in the conventional construction shown in FIG. 1b.

FIG. 10$i_2$ illustrates a single cavity device (SCD), wherein the input waveguide pathway 108a' and the output waveguide pathway 108b' are also on the same side of the substrate, as distinguished from the conventional construction illustrated in FIG. 1a. Providing the SCD with the input and output waveguide pathways on the same side of the substrate permits greater flexibility in design, which may be advantageous in many applications of integrated optical devices.

EXAMPLE 8

Figure 11A:
Figure 11B:
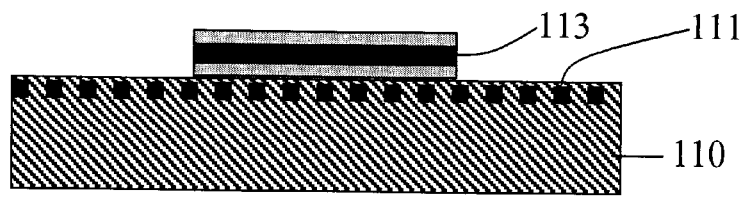
Figure 11C:
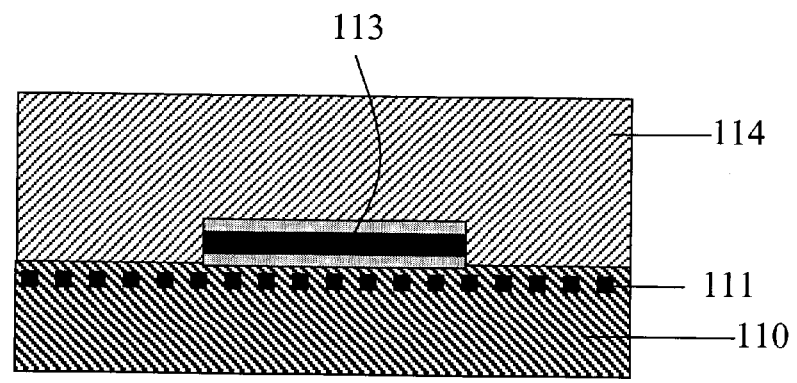
Figure 11D:
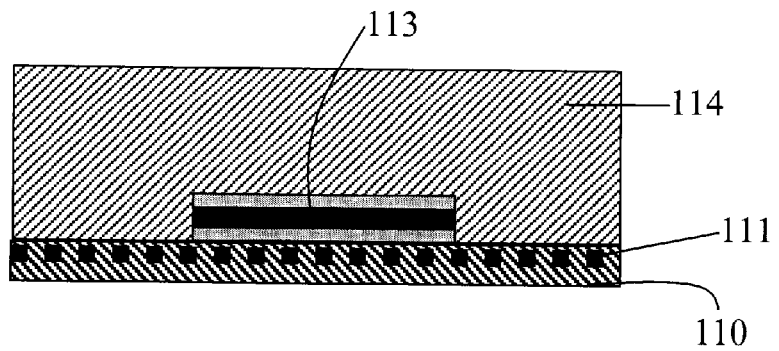

(FIGS. 11a–11$i_2$)

Steps 11a–11e of this example are similar to the steps illustrated in FIGS. 7$a_1$–7$d_2$ in the above-described Example 4, to produce a thinned lithium niobate substrate 110 formed on its upper surface 110a with a waveguide pathway 111, and bonded to a thick silicon substrate 114 embedding, at the interaction zone, a patterned metal electrode layer 113, and its buffer layers 112a, 112b, over the waveguide pathway 111 at the interaction zone. The opposite surface of the thinned substrate 110 carries another patterned metal electrode layer 116, between buffer layers 116a, 116b, also in the interaction zone.

Figure 11F:
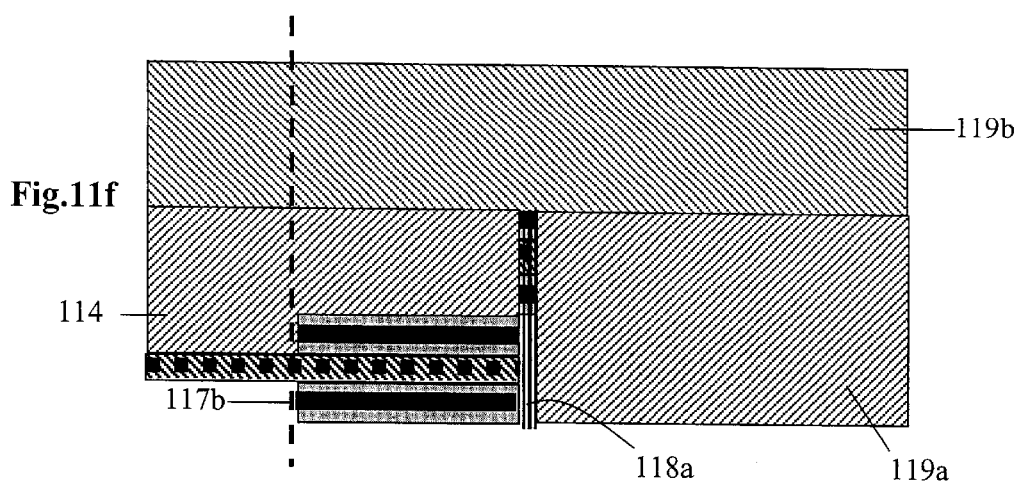
Figure 11E:
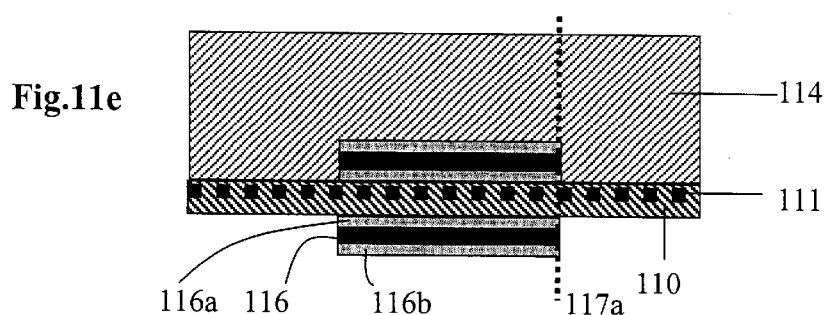
Figure 11G:
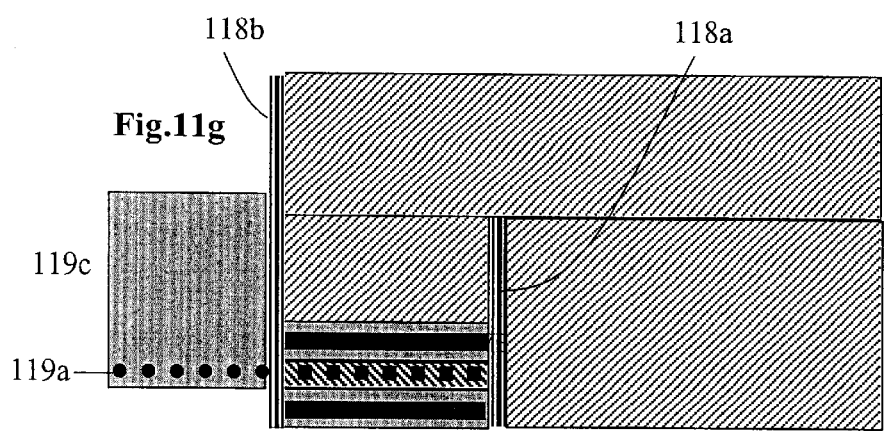
Figure 11H:
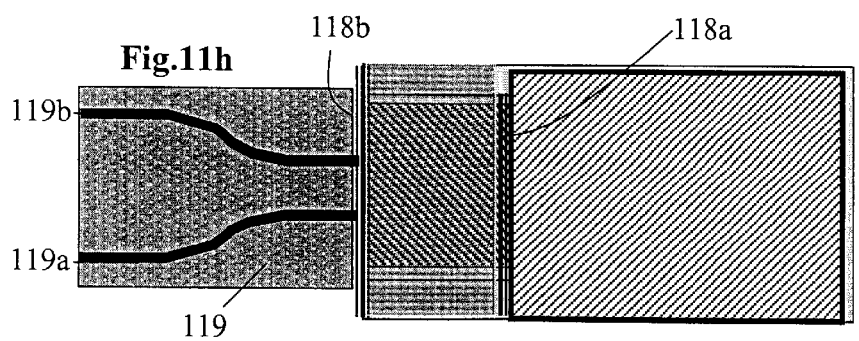

As shown in FIG. 11e, the device is cut along a perpendicular line 117a to define the back facet of the interaction zone. This edge is polished, and the reflector coating 118a is applied to serve as the back reflector facet of the optical cavity to be produced. This back reflector coating 118a is shown in FIG. 11f after another silicon substrate 119a has been bonded to that face of substrate 114, and a further supporting substrate 119b has been bonded to the faces of both substrates 114 and 119b opposite to the waveguide layer 111.

The two substrates 119b and 114 are then cut along a perpendicular line 117b to define the front facet of the optical cavity to be produced in the interaction zone; and after this cut edge is polished, the front reflector coating 118b is applied. This is followed by the bonding of a third substrate 119c to define the access zone or a part thereof, including the input and output waveguide pathways 119a, 119b, as described above. It will be appreciated that, this method may also be used to produce optical devices in which the input and output waveguide pathways in the access zone are on the same side of the interaction zone, not only in double cavity devices (DCD) as in the prior art, but also in single cavity devices (SCD) as distinguished from the prior art.

A Further Advantageous Feature (FIGS. 12a–12b)

FIGS. 12a and 12b illustrate a further advantageous attainable by the novel methods of the present invention, particularly where the integrated optical device is constructed of a thinned lithium niobate substrate carrying the waveguide pathways, and a thick silicon substrate acting as a heat sink as well as a mechanical supporting structure.

FIG. 12a is a cross-sectional view of the interaction zone of the DCD or SCD, wherein it will be seen that the thinned lithium niobate substrate 120 is bonded to the silicon substrate 121 and carries a bottom electrode 122, the optical cavity or cavities (123a, 123b) in the interaction zone, and the top electrodes 124a, 124b. Such as construction may be produced by any one of the Example 3–8 methods described above.

If a notch is cut between the two top electrodes 124a, 124b on the thinned lithium niobate face 120, as shown at 125 in FIG. 12b, the electrical field is confined to the paths between the opposite electrodes since the field trajectory through the lithium niobate layer 120 is made significantly longer than the path between the bottom electrode 122 and the top electrodes 123a, 124a. This improves the overlap in the electrical-optical fields, and therefore improves the efficiency and reduces the power requirements of the device.

While this improvement, as well as other features of the invention described above are particularly applicable to cavity-assisted directional couplers, it will be appreciated that such features could be applied as well to other optical devices particularly those based on thinned substrates, and made of other electro-optic materials.

Also, while the invention has been described with respect to several preferred embodiments, it will be appreciated that these are set forth merely for purposes of example, and that many other variations, modifications and applications of the invention may be made.

What is claimed is:

1. A method of making a cavity-assisted directional-coupler, comprising a substrate including waveguide pathways each having a higher refractive index than the substrate for guiding the transmission of light therethrough, and a plurality of electrodes to receive electrical signals for controlling the light transmission through said pathways; said waveguide pathways being included in an interaction zone and being of an electro-optically active waveguide material whose refractive index changes in response to electrical signals applied to said electrodes; said waveguide pathways also being included in an access zone providing optical access to said interaction zone; said active waveguide material in said interaction zone being a different material from the waveguide material in said access zone; said interaction zone including an optical cavity having front and back ends defined by reflector facets perpendicular to the longitudinal axis of the optical cavity;

wherein in said method, said reflector facets are made by etching said substrate to form said perpendicular facets, and then applying reflector coatings to said perpendicular facets.

2. The method according to claim 1, wherein said etching forms trenches at the front end and at the back end of the optical cavity; and the application of said reflector coating includes applying a non-reflector coating to the front facet of the front trench, a semi-reflecting coating to the back facet of the front trench, and a fully-reflecting coating to the front facet of the back trench.

3. A method of making a cavity-assisted directional-coupler, comprising a substrate including waveguide pathways each having a higher refractive index than the substrate for guiding the transmission of light therethrough, and a plurality of electrodes to receive electrical signals for controlling the light transmission through said pathways; said waveguide pathways being included in an interaction zone and being of an electro-optically active waveguide material whose refractive index changes in response to electrical signals applied to said electrodes; said waveguide pathways also being included in an access zone providing optical access to said interaction zone; said active waveguide material in said interaction zone being a different material from the waveguide material in said access zone; said interaction zone including an optical cavity having front and back ends defined by reflector facets perpendicular to the longitudinal axis of the optical cavity;

wherein in said method, said reflector facets are made by cutting the substrate along perpendicular cut lines to define the front end and the back end of the optical cavity; polishing the cut edges; applying reflector coatings to the cut edges; and bonding to the substrate at the front end of the optical cavity an additional substrate provided with waveguide pathways for at least a part of the access zone.

4. The method according to claim 3, wherein the application of said reflector coatings includes applying a semi-reflecting coating to the front facet of the optical cavity, and a fully-reflecting coating to the back facet of the optical cavity.

5. A method of making a cavity-assisted directional-coupler, comprising a substrate including waveguide pathways each having a higher refractive index than the substrate for guiding the transmission of light therethrough, and a plurality of electrodes to receive electrical signals for controlling the light transmission through said pathways; said waveguide pathways being included in an interaction zone and being of an electro-optically active waveguide material whose refractive index changes in response to electrical signals applied to said electrodes; said waveguide pathways also being included in an access zone providing optical access to said interaction zone; said active waveguide material in said interaction zone being a different material from the waveguide material in said access zone; said interaction zone including an optical cavity having front and back ends defined by reflector facets perpendicular to the longitudinal axis of the optical cavity; said method comprising:

provide the substrate with a layer including the waveguide pathways of one of said zones;

etching said layer to define said perpendicular facets of the optical cavity of the interaction zone;

depositing reflector coatings on said perpendicular facets;

and applying the waveguide material to the substrate to define the waveguide pathways of the other of said zones.

6. The method according to claim 5, wherein the substrate is provided with the waveguide pathways of said access zone before the etching step, and the waveguide pathways of said interaction zone after said etching step.

7. The method according to claim 5, wherein the substrate is provided with the waveguide pathways of said interaction zone before the etching step, and the waveguide pathways of said access zone after said etching step.

8. A method of making a cavity-assisted directional-coupler, comprising a substrate including waveguide pathways each having a higher refractive index than the substrate for guiding the transmission of light therethrough, and a plurality of electrodes to receive electrical signals for controlling the light transmission through said pathways; said waveguide pathways being included in an interaction zone and being of an electro-optically active waveguide material whose refractive index changes in response to electrical signals applied to said electrodes; said waveguide pathways also being included in an access zone providing optical access to said interaction zone; said active waveguide material in said interaction zone being a different material from the waveguide material in said access zone; said interaction zone including an optical cavity having front and back ends defined by reflector facets perpendicular to the longitudinal axis of the optical cavity; said method comprising:

forming said waveguide pathways of a first waveguide material in one of said zones;

forming said reflector facets defining the front and back ends of the optical cavity in the interaction zone;

and then forming said waveguide pathways of a second waveguide material in the other of said zones.

9. The method according to claim 8, wherein:

said waveguide pathways are formed in said access zone of an electro-optically passive waveguide material before said reflector facets of the optical cavity are formed;

and said waveguide pathways are formed in said interaction zone of an electro-optically active waveguide material after said reflector facets of the optical cavity are formed.

10. The method according to claim 8, wherein:

said waveguide pathways are formed in said interaction zone of an electro-optically active waveguide material before said reflector facets of the optical cavity are formed;

and said waveguide pathways are formed in said access zone of an electro-optically passive waveguide material after said reflector facets of the optical cavity are formed.

11. The method according to claim 8, wherein said front and back reflector facets of the optical cavity are formed by: etching the substrate to produce perpendicular facets at the front and back ends of the optical cavity; and applying reflector coatings to said perpendicular facets.

12. The method according to claim 8, wherein:

said waveguide pathways in the interaction zone are formed in a first substrate;

said first substrate is bonded to a second substrate to embed said waveguide pathways in the interaction zone;

and one of said substrates is etched to produce said perpendicular facets at the front and back ends of the optical cavity.

13. The method according to claim 12, wherein said perpendicular facets at the opposite ends of the optical cavity are produced by etching said first substrate.

14. The method according to claim 13, wherein said first substrate is thinned before being etched to produce said perpendicular facets.

15. The method according to claim 12, wherein said second substrate is etched to form a mask for etching said first substrate to produce said perpendicular facets at the opposite ends of the optical cavity.

16. The method according to claim 15, wherein said first substrate is thinned before being etched via said mask defined by the second substrate.

17. The method according to claim 15, wherein said second substrate is removed after the first substrate is etched via the mask produced by the second substrate.

18. The method according to claim 17, wherein, after said second substrate is removed, said interaction zone of the first substrate is masked, and waveguide pathways of the access zone are applied.

19. The method according to claim 12, wherein said first substrate is selected from $LiNbO_3$, GaAs and InP; said second substrate is silicon; said active waveguide material is the same material as said first substrate but activated to increase its refractive index; and said passive waveguide material is selected from $SiO_2$ and a polymer.

20. The method according to claim 8, wherein said front and back facets of the optical cavity are formed by:

cutting the substrate along lines perpendicular to the longitudinal axis of the optical cavity;

polishing the cut edges to define front and back perpendicular facets of the optical cavity;

and applying the reflector coatings to said perpendicular facets.

21. The method according to claim 20, wherein said waveguide pathways of the interaction zone are formed in one face of said substrate, and at least one electrode is applied over and insulated from said waveguide pathways of the interaction zone and is also cut along said perpendicular lines.

22. A method of making a cavity-assisted directional-coupler device having waveguide pathways interacting with an optical cavity, comprising:

forming said waveguide pathways on a substrate;

cutting and polishing the substrate along lines perpendicular to the longitudinal axis of the optical cavity to define front and perpendicular back facets for the optical cavity;

and applying reflector coatings to said perpendicular facets.

23. The method according to claim 22, wherein said substrate is bonded to a supporting substrate at the time it is cut along at least one of said lines.

24. The method according to claim 23, wherein said supporting substrate is bonded to the face of said first-mentioned substrate opposite to said one face formed with said waveguide pathways.

25. The method according to claim 23, wherein said supporting substrate is bonded to said one face of the first-mentioned substrate formed with said waveguide pathways to embed said waveguide pathways.

26. The method according to claim 25, wherein after said supporting substrate is bonded to said first-mentioned substrate, the first-mentioned substrate is thinned, and an electrode is applied over and insulated from the waveguide pathways in the first-mentioned substrate which electrode is also cut along said perpendicular lines.

27. The method according to claim 23, wherein said first-mentioned substrate is LiNbO$_3$, and said supporting substrate is silicon.

28. A method of making an integrated optical device, comprising a substrate including waveguide pathways each having a higher refractive index than the substrate for guiding the transmission of light therethrough, and a plurality of electrodes to receive electrical signals for controlling the light transmission through said pathways; said waveguide pathways being included in an interaction zone and being of an electro-optically active waveguide material whose refractive index changes in response to electrical signals applied to said electrodes; said waveguide pathways also being included in an access zone providing optical access to said interaction zone; said device including a cavity-assisted directional-coupler in which the interaction zone includes an optical cavity having front and back ends defined by reflector facets perpendicular to the longitudinal axis of the optical cavity; said reflector facets for the optical cavity being defined by trenchless formations in the substrate and consisting of a semi-reflecting facet at the front end of the optical cavity and a fully-reflecting facet at the back end of the optical cavity;

wherein in said method, said reflector facets are made by: cutting the substrate along perpendicular cut lines to define the front end and the back end of the optical cavity; polishing the cut edges; applying reflector coatings to the cut edges; and bonding an additional substrate to the substrate at the front and back ends of the optical cavity.

29. A method of making an integrated optical device, comprising a substrate including waveguide pathways each having a higher refractive index than the substrate for guiding the transmission of light therethrough, and a plurality of electrodes to receive electrical signals for controlling the light transmission through said pathways; said waveguide pathways being included in an interaction zone and being of an electro-optically active waveguide material whose refractive index changes in response to electrical signals applied to said electrodes; said waveguide pathways also being included in an access zone providing optical access to said interaction zone; said device inlcuding a cavity-assisted directional-coupler in which the interaction zone includes a single optical cavity having front and back ends defined by reflector facets perpendicular to the longitudinal axis of the optical cavity; said access zone including an input waveguide pathway and an output waveguide pathway; said input waveguide pathway and said output wave guide pathway being coupled to the optical cavity on the same side of the substrate;

wherein in said method, said reflector facets are made by: cutting the substrate along perpendicular cut lines to define the front end and the back end of the optical cavity; polishing the cut edges; applying reflector coatings to the cut edges; and bonding to the substrate at the front end of the optical cavity an additional substrate provided with waveguide pathways for at least a part of the access zone.

30. A method of making an integrated optical device, comprising a substrate including waveguide pathways on one face each having a higher refractive index than the substrate for guiding the transmission of light therethrough, and a plurality of electrodes to receive electrical signals for controlling the light transmission through said pathways; said waveguide pathways being included in an interaction zone and being of an electro-optically active waveguide material whose refractive index changes in response to electrical signals applied to said electrodes; said waveguide pathways also being included in an access zone providing optical access to said interaction zone; a second substrate being bonded to the opposite face of said first substrate and is formed of a material having a higher heat capacity than the material of the first substrate so as to serve as a heat sink for said first substrate;

wherein in said method, said reflector facets are made by: cutting the substrate along perpendicular cut lines to define the front end and the back end of the optical cavity; polishing the cut edges; applying reflector coatings to the cut edges; and bonding an additional substrate to the substrate at the front and back ends of the optical cavity.

31. A method of making an integrated optical device including waveguide pathways defining an optical cavity in an interaction zone, and waveguide pathways in an access zone; said method comprising:

forming said waveguide pathways of one zone in a first substrate;

bonding said first substrate to a second substrate to embed said waveguide pathways;

etching one of said substrates to produce perpendicular facets at the front and back ends of the optical cavity in the interaction zone;

and applying reflector coatings to said perpendicular facets.

32. The method according to claim 31, wherein said perpendicular facets at the opposite ends of the optical cavity are produced by etching said first substrate.

33. The method according to claim 32, wherein said first substrate is thinned before being etched to produce said perpendicular facets.

34. The method according to claim 31, wherein said second substrate is etched to form a mask for etching said first substrate to produce said perpendicular facets at the opposite ends of the optical cavity.

35. The method according to claim 34, wherein said first substrate is thinned before being etched via said mask defined by the second substrate.

36. The method according to claim 34, wherein said second substrate is removed after the first substrate is etched via the mask produced by the second substrate.

37. The method according to claim 36, wherein, after said second substrate is removed, said interaction zone of the first substrate is masked, and the waveguide pathways of the access zone are applied.

38. The method according to claim 31, wherein said first substrate is selected from LiNbO$_3$, GaAs and InP; and said second substrate is silicon.

39. A method of making an integrated optical device having waveguide pathways in an interaction zone including an optical cavity confined between front and back reflector facets, and waveguide pathways in an access zone providing access to the interaction zone; said method comprising:

forming a substrate with smooth, flat facets at the front and back ends of the optical cavity and projecting perpendicularly to the longitudinal axis of the optical cavity;

applying reflector layers to said front and back facets;

and then applying waveguide material to the substrate to define the waveguide pathways in the interaction zone and access zone.

40. The method according to claim 39, wherein the front facet is formed by producing a narrow upstanding ridge in the substrate between the access zone and the interaction zone; the front face of said narrow ridge facing the access zone receiving an anti-reflecting layer; and the back face of said narrow ridge facing the interaction zone receiving a semi-reflecting coating.

41. The method according to claim 39, wherein the waveguide material defining the waveguide pathways in the interaction zone is the same as the waveguide material defining the waveguide pathways in the access zone.

42. The method according to claim 41, wherein said waveguide material is an EO polymer.

43. The method according to claim 39, wherein the waveguide material defining the waveguide pathways in the interaction zone is different from that defining the waveguide pathways in the access zone.

* * * * *